United States Patent [19]

Sullivan

[11] Patent Number: 5,440,673
[45] Date of Patent: Aug. 8, 1995

[54] METHOD AND APPARATUS FOR PIXEL SYNCHRONIZATION

[75] Inventor: Paul F. Sullivan, Westwood, Mass.

[73] Assignee: Polaroid Corporation, Cambridge, Mass.

[21] Appl. No.: 933,669

[22] Filed: Aug. 24, 1992

[51] Int. Cl.[6] .............................................. H04N 1/36
[52] U.S. Cl. ................................................... 395/109
[58] Field of Search ................ 395/107, 109; 358/409, 358/410, 500; 346/7, 8, 154; 364/154

[56] References Cited

U.S. PATENT DOCUMENTS

| | | | |
|---|---|---|---|
| 2,926,247 | 2/1960 | Palmer | 250/27 |
| 4,268,867 | 5/1981 | Traino | 358/285 |
| 4,330,751 | 5/1982 | Swain | 328/61 |
| 4,587,531 | 5/1986 | Dangler | 346/108 |
| 4,683,499 | 7/1987 | Kuwabara | 358/264 |
| 4,745,629 | 5/1988 | Essig et al. | 377/20 |
| 4,860,118 | 8/1989 | Arimoto | 358/451 |
| 4,862,289 | 8/1989 | Shimada | 358/298 |
| 4,897,734 | 1/1990 | Sato et al. | 358/448 |
| 4,962,981 | 10/1990 | Murakami et al. | 350/6.7 |
| 4,963,989 | 10/1990 | Morton | 358/298 |
| 5,025,322 | 6/1991 | Ng | 358/298 |
| 5,313,283 | 5/1994 | Rice et al. | 358/350 |

Primary Examiner—Mark R. Powell
Assistant Examiner—Gabriel Garcia
Attorney, Agent, or Firm—Robert A. Sabourin; Edward S. Roman

[57] ABSTRACT

An apparatus and a method are provided which can control an intensity level of an exposing device so that a desired pixel density is consistently disposed on a correct location on an image recording medium. Specifically, within a printing apparatus, even channel circuitry controls the intensity level of the exposing device during exposure of even numbered pixels on the image recording medium and an odd channel circuitry controls the intensity level of the exposing device during the exposure of odd numbered pixels on the image recording medium.

32 Claims, 8 Drawing Sheets

METHOD AND APPARATUS FOR PIXEL SYNCHRONIZATION

FIELD OF THE INVENTION

This invention relates generally to a printing apparatus and, more particularly, to an apparatus and a method for controlling the intensity level of an exposing device so that desired print densities provided by the printing apparatus are disposed on the image recording medium in approximately the correct locations.

BACKGROUND OF THE INVENTION

In a scanning printer which produces continuous tone images, an exposing device in the printer should travel across an image recording medium with as near a constant scanning velocity as possible in order to produce a high quality image on the image recording medium. Presently, circuitry which controls the positioning of the exposing device cannot meet this requirement to produce a sufficiently constant scanning velocity for the exposing device relative to the image recording medium. Accordingly, data circuitry which controls both the timing and the image management aspects of the printer compensates for this inability by using a variety of different approaches.

One approach that has been used extensively is to employ a variable frequency oscillator as a high frequency pixel clock and a phase locked feedback loop interconnecting the high frequency clock to a position encoder. Critical to the success of this approach is the design of the feedback loop. If the loop responds too slowly, the position of pixels on the image recording medium will wander excessively with small changes in the scanning velocity of the exposing device. On the other hand, if the loop responds too fast, the phase locked feedback loop will tend to ring in response to sudden changes in the scanning velocity of the exposing device. Regardless of the tuning of the loop, this approach exacerbates errors in print density that arise when the scanning velocity changes. When the scanning velocity of the exposing device increases, the energy density of the exposure necessarily decreases which results in underexposure of the image recording medium. In addition, the variable frequency phase locked loop increases its frequency which shortens the exposing time for the exposing device. For constant exposing power, this means that less total energy is delivered to the image recording medium which, in turn, results in further underexposure of the image recording medium.

To avoid the problems associated with the feedback loop system, another approach has been employed. This approach employs: a spatial clock which produces a spatial clock pulsetrain wherein each spatial clock pulse defines the amount of time required for an exposing device to travel across a set distance on the image recording medium; a fixed timing clock which produces timing clock pulses at a rate substantially faster than the spatial clock; and a counter which counts the timing clock pulses until a terminal value is reached and which has a phase that is periodically shifted to match that of the spatial clock. In this approach, the rising edge of the spatial clock triggers the counter to start counting to a terminal value. When the value of the count reaches a value associated with a desired print density of the pixel to be printed, the intensity level of the exposing device is switched from a first state which is the "on" state to a second state which is the "off" state. Then, when the counter reaches the terminal value, the intensity level of the exposing device is again switched from the second state back to the first state.

This approach provides the proper duration of the intensity level of the exposing device at the proper state when the spatial clock is running at the normal rate. However, when the spatial clock is substantially faster than normal or substantially slower than normal, problems occur. This approach may keep the intensity level of the exposing device at a given state for too long a period when the spatial clock is substantially slower than normal. This occurs because the count reaches the terminal value before the next rising edge of the next spatial clock pulse and thereby switches the intensity level of the exposing device to the first state too soon. This approach may also prevent the printing apparatus from switching the intensity level of the exposing device to the first state when the spatial clock is substantially faster than normal. This occurs because the count never reaches the terminal value so that the intensity level of the exposing device can change from the second state to the first state.

As a result, a need still exists in the art for improved data circuitry that can control the intensity level of the exposing device so that the desired pixel density can be consistently disposed on the image recording medium in a manner whereby the deleterious effects associated with a fast or a slow spatial clock are minimized.

SUMMARY OF THE INVENTION

Embodiments of the present invention solve the above-identified problem by providing within a printing apparatus an even channel circuitry which controls the intensity level of the exposing device during exposure of the even numbered pixels on the image recording medium and an odd channel circuitry which controls the intensity level of the exposing device during the exposure of the odd numbered pixels on the image recording medium.

In one embodiment of the present invention, even channel circuitry and odd channel circuitry receive from the printing apparatus even and odd numbered spatial clock pulses, respectively, a desired print density for each even and odd numbered pixel to be printed, respectively, and timing clock pulses. A plurality of sequential timing clock pulses defines a pixel print cycle and each pixel print cycle defines the period during which the exposing device will expose a single pixel on the image recording medium. The even channel circuitry, at the rising edge of the even numbered spatial clock pulses, counts the timing clock pulses until a terminal value is reached. When the count reaches a value associated with a desired print density of the present even numbered pixel to be printed, the even channel circuitry requests that the intensity level of the exposing device be changed from an initial first state to a second state. Thereafter, if the desired print density of the present even numbered pixel to be printed is less than a standard print density, the even channel circuitry adds or subtracts timing clock pulses to or from the present even numbered pixel print cycle so that the present even numbered pixel print cycle will terminate at the rising edge of the next odd numbered spatial clock pulse. At the rising edge of the next odd numbered spatial clock pulse, the even channel circuitry enables the odd channel circuitry to control the intensity level of the exposing device. Alternatively, if the desired print density of the present even numbered pixel to be printed is greater than the standard print density, the even channel circuitry adds or subtracts timing clock pulses to or from the next odd numbered pixel print cycle so that the next pixel odd numbered print cycle will start when the even count reaches the terminal value. When the count reaches the terminal value, the even channel circuitry enables the odd channel circuitry to control the intensity level of the exposing device. Thereafter, regardless of the desired print density of the present even numbered pixel to printed, the even channel circuitry requests that the exposing device be set to the first state in anticipation of the even channel circuitry's regaining control over the intensity level of the exposing device.

Similarly, the odd channel circuitry, at the rising edge of the odd numbered spatial clock pulses, counts the timing clock pulses until the terminal value is reached. When the count reaches a value associated with a desired print density of the present odd numbered pixel to be printed, the odd channel circuitry requests that the intensity level of the exposing device be changed from the first initial state to the second state. Thereafter, if the desired print density of the present odd numbered pixel to be printed is less than the standard print density, the odd channel circuitry adds or subtracts timing clock pulses to or from the present odd numbered pixel print cycle so that the present odd numbered pixel print cycle will terminate at the rising edge of the next even spatial clock pulse. At the rising edge of the next even numbered spatial clock pulse, the odd channel circuitry enables the even channel circuitry to control the intensity level of the exposing device. Alternatively, if the desired print density of the present odd numbered pixel to be printed is greater than the standard print density, the odd channel circuitry adds or subtracts timing clock pulses to or from the next even numbered pixel print cycle so that the next even numbered pixel print cycle will start when the odd count reaches the terminal value. When the count reaches the terminal value, the odd channel circuitry enables the even channel circuitry to control the intensity level of the exposing device. Thereafter, regardless of the desired print density of the present odd numbered pixel to be printed, the odd channel circuitry requests that the exposing device be set to the first state in anticipation of the odd channel circuitry's regaining control over the intensity level of the exposing device.

In a second embodiment of the present invention, even channel circuitry and odd channel circuitry receive from the printing apparatus even and odd numbered spatial clock pulses, respectively, a desired print density for each even and odd numbered pixel to be printed, respectively, and timing clock pulses. The even channel circuitry, at the rising edge of the even numbered spatial clock pulses, counts the timing clock pulses until a terminal value is reached. When the count reaches a value associated with a desired print density of a present even numbered pixel to be printed, the even channel circuitry requests that the exposing device be changed from the first initial state to the second state. Thereafter, the even channel circuitry passes control over the intensity level of the exposing device to an odd channel circuitry as follows. If the desired print density of the present even numbered pixel to be printed is less than a standard print density, the even channel circuitry passes control over the intensity level of the exposing device to the odd channel circuitry at the rising edge of the next odd numbered spatial clock pulse. Alternatively, if the desired print density of the present even numbered pixel to be printed is greater than the standard print density, the even channel circuitry passes control over the intensity level of the exposing device to the odd channel circuitry when the count reaches the terminal value. Thereafter, regardless of the desired print density of the present even numbered pixel to be printed, the even channel circuitry requests that the exposing device be set to the first state in anticipation of the even channel circuitry's regaining control over the intensity level of the exposing device.

Similarly, the odd channel circuitry, at the rising edge of the odd numbered spatial clock pulses, counts the timing clock pulses until the terminal value is reached. When the count reaches a value associated with a desired print density of a present odd numbered pixel to be printed, the odd channel circuitry requests that the intensity level of the exposing device be changed from the first initial state to the second state. Thereafter, the odd channel circuitry passes control over the intensity level of the exposing device to the even channel circuitry as follows. If the desired print density of the present odd numbered pixel to be printed is less than the standard print density, the odd channel circuitry passes control over the intensity level of the exposing device to the even channel circuitry at the rising edge of the next even numbered spatial clock pulse. Alternatively, if the desired print density of the present odd numbered pixel to be printed is greater than the standard print density, the odd channel circuitry passes control over the intensity level of the exposing device to the even channel circuitry when the count reaches the terminal value. Thereafter, regardless of the standard print density of the present odd numbered pixel to be printed, the odd channel circuitry requests that the exposing device be set to the first state in anticipation of the odd channel circuitry's regaining control over the intensity level of the exposing device.

More specifically, in each embodiment discussed above, the even channel circuitry comprises an even counter circuitry, an even comparator circuitry, an even termination selector circuitry, and an even request circuitry. The even counter circuitry, upon receipt of an even rising edge signal from a spatial clock rising edge detector circuitry, to be discussed fully below, starts counting the timing signals generated by the printing apparatus until the terminal value is reached. During this period, the even counter circuitry continually generates an even count signal for each timing clock pulse that is counted and then generates an even overflow signal when the even count signal exceeds the terminal value. An even comparator circuitry receives the continually generated even count signal from the even counter circuitry and the desired print density of the present even pixel to be printed from the printing apparatus. The even comparator circuitry then generates an even comparator signal when the value of the even count signal reaches the value associated with the desired print density of the present even numbered pixel to be printed. An even termination selector circuitry receives the odd rising edge signal from the spatial clock rising edge detector circuitry, the standard print density associated with the present even numbered pixel to be printed from the printing apparatus, and the even overflow signal from the even counter circuitry. The even termination selector circuitry then generates an even termination signal upon either (i) receipt of the even overflow signal if the desired print density associated with the present even pixel to be printed is greater than the standard print density value or (ii) receipt of the odd rising edge signal if the desired print density associated with the present even pixel to be printed is less than the standard print density value. Finally, an even request circuitry generates an even request signal upon the receipt of the even termination signal from the even termination selector circuitry and disables the even request signal upon receipt of the even comparator signal from the even comparator circuitry.

Similarly, in each embodiment discussed above, the odd channel circuitry comprises an odd counter circuitry, an odd comparator circuitry, an odd termination selector circuitry, and an odd request circuitry. The odd counter circuitry, upon receipt of an odd rising edge signal from a spatial clock rising edge detector circuitry, starts counting the timing signals generated by the printing apparatus until the terminal value is reached. During this period, the odd counter circuitry continually generates an odd count signal for each timing clock pulse that is counted and then generates an odd overflow signal when the odd count signal exceeds the terminal value. An odd comparator circuitry receives the continually generated odd count signal from the odd counter circuitry and the desired print density of the present odd pixel to be printed from the printing apparatus. The odd comparator circuitry then generates an odd comparator signal when the value of the odd count signal reaches the value associated with the desired print density of the present odd numbered pixel to be printed. An odd termination selector circuitry receives the even rising edge signal from the spatial clock rising edge detector circuitry, the standard print density associated with the present odd numbered pixel to be printed from the printing apparatus, and the odd overflow signal from the odd counter circuitry. The odd termination selector circuitry then generates an odd termination signal upon either (i) receipt of the odd overflow signal if the desired print density associated with the present odd pixel to be printed is greater than the standard print density value or (ii) receipt of the even rising edge signal if the desired print density associated with the present odd pixel to be printed is less than the standard print density value. Finally, an odd request circuitry generates an odd request signal upon the receipt of the odd termination signal from the odd termination selector circuitry and disables the odd request signal upon the receipt of the odd comparator signal from the odd comparator circuitry.

In each embodiment discussed above, the even channel circuitry and the odd channel circuitry jointly share a spatial clock rising edge detector circuitry and selection circuitry. The spatial clock rising edge detector circuitry receives the spatial clock pulses and the timing clock pulses from the printing apparatus and provides the odd rising edge signal at the rising edge of each odd spatial clock pulse and the even rising edge signal at the rising edge of each even spatial clock pulse. Similarly, the selection circuitry receives both termination signals and both channel request signals from, respectively, both termination selector circuitry and both request circuitry. The selection circuitry then passes control of the intensity level of the exposing device (i) to the even request signal upon receipt of the odd termination signal or (ii) to the odd request signal upon receipt of the even termination signal.

The novel even and odd channel circuitry discussed above also share several common novel characteristics. First, the ratio of the frequency of the timing clock to the nominal frequency of the spatial clock defines the terminal count. Second, the standard print density is substantially at the minimum of the derivative of the perceived lightness with respect to the exposure of the image recording medium or, alternatively, is in the range between 0.4 to 0.6 of the maximum value for the desired print density. Finally, the first and second state of the even and the odd request signals are related to two different intensity setting levels on the exposing device, preferably, on and off.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

FIGS. 3-1 and 3-2 are waveform diagrams useful in explaining the steady state operation of the pixel synchronizer circuitry of FIG. 1A when the spatial clock is at a low frequency; and FIGS. 4-1 and 4-2 are waveform diagrams useful in explaining the steady state operation of the pixel synchronizer circuitry of FIG. 1A when the spatial clock is at a high frequency.

DESCRIPTION OF THE PREFERRED EMBODIMENTS

Figure 1A:
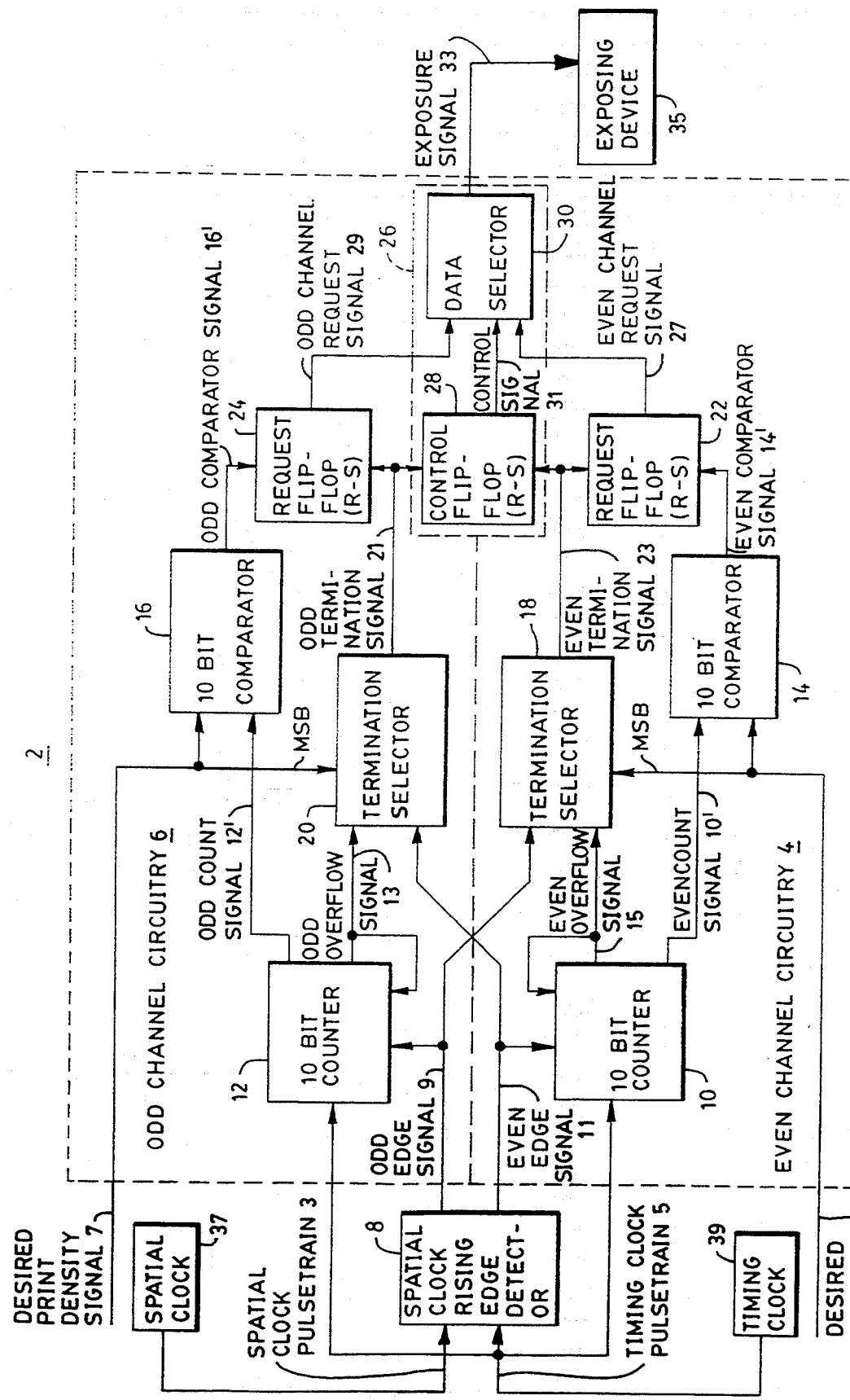
FIG. 1A is an electrical block diagram of the preferred pixel synchronizer circuitry of the present invention connected to the exposure device.

FIG. 1A shows data circuitry 2 which resides within an image processing apparatus and which controls the intensity level (on-off) of an exposing device 35 so that the correct pixel density is consistently exposed at approximately the correct location on an image recording medium. The data circuitry 2 comprises even channel circuitry 4 which controls the intensity level of the exposing device 35 during exposure of the even numbered pixels on the image recording medium and odd channel circuitry 6 which controls the intensity level of the exposing device 35 during the exposure of the odd numbered pixels on the image recording medium.

The data circuitry 2 receives from the printing apparatus a spatial clock pulsetrain 3, a timing clock pulsetrain 5, and a signal 7 associated with a desired print density. The spatial clock pulsetrain 3 is divided into individual spatial clock pulses and each spatial clock pulse is the actual time that the exposing device 35 spends traveling across a known set distance of the image recording medium. In the embodiment shown in FIG. 1A, as the exposing device 35 travels across each pixel on the image recording medium, a spatial clock pulse will be generated. The diameter of one pixel on the image recording medium is approximately 18 microns. Similarly, the timing clock pulsetrain 5 is divided into individual timing clock pulses and a plurality of sequential timing clock pulses defines the period that the exposing device 35 spends exposing a single pixel on the image recording medium. Accordingly, the timing clock pulsetrain 5 has a frequency that is substantially greater than that of the spatial clock pulsetrain 3 and, in the embodiment shown in FIG. 1A, the timing clock pulsetrain 5 has a 32 megahertz frequency. The signal 7 associated with the desired print density is part of the image data associated with each pixel that is to be printed. Specifically, the desired print density is the print density that the printing apparatus wants to expose onto a given pixel location on the image recording medium; however, the desired print density may not be the actual print density that is ultimately exposed onto the image recording medium. The desired print density may also be thought of as the energy that is to be delivered to a given pixel location on the image recording medium. Alternatively, the desired pixel density is also indicative of where physically within the pixel the exposing beam from the exposing device 35 will be turned on or turned off.

DISCUSSION OF FIG. 1A

Referring once again to FIG. 1A, a spatial clock rising edge detector 8 receives the spatial clock pulsetrain 3 and the timing clock pulsetrain 5 and produces therefrom an odd edge signal 9 for each rising edge of an odd numbered spatial clock pulse and an even edge signal 11 for each rising edge of an even numbered spatial clock pulse. An even channel 10 bit counter 10 in the even channel circuitry 4 receives the even edge signal 11 from the spatial clock rising edge detector 8 and timing clock pulses from the printing apparatus. Similarly, an odd channel 10 bit counter 12 in the odd channel circuitry 6 receives the odd edge signal 9 from the spatial clock rising edge detector 8 and the timing clock pulses from the printing apparatus.

Upon receipt of the respective edge signal, each counter 10, and 12 starts counting the timing clock pulses and starts generating a count signal (i.e. odd count signal 12' and even count signal 10', respectively) which is incrementally increased for each timing clock pulse that is counted. In this embodiment, the count signal incrementally increases from 0 to 1023. Ideally, in this embodiment, the exposing device 35 should travel across one pixel in the time it takes the counter 10, or 12 to incrementally increase the count signal 10' or 12' from 0 to 1023. Alternatively, this means that one spatial clock pulse should equal exactly 1024 sequential timing clock pulses. If one spatial clock pulse does equal 1024 sequential timing clock pulses, then the spatial clock is said to be running at a normal frequency. That is, the exposing device 35 is traveling across the image recording medium at a correct constant velocity which is 0.6 meters per second in this embodiment. The correct constant velocity for a given exposing device 35 and a given image recording medium is dependent on the pixel size, the exposure rate of the image recording medium, and the power delivered to the image recording medium by the exposing device 35. If a spatial clock pulse equals less than 1024 sequential timing clock pulses, the spatial clock pulse associated with the pixel is said to be running at a high frequency which means that the exposing device 35 is traveling too fast across the pixel. Alternatively, if a spatial clock pulse equals more than 1024 sequential timing clock pulses, the spatial clock pulse associated with the pixel is said to be running at a low frequency which means that the exposing device 35 is traveling too slowly across pixel.

Each counter 10, and 12 also generates an overflow signal (i.e. odd overflow signal 13 and even overflow signal 15, respectively) when the count signal exceeds the capacity of the counter 10, or 12. In this embodiment, this occurs when the count signal 10' or 12' exceeds a value of 1023. The even count signal 10' produced by the even channel counter 10 along with the desired print density signal 7 provided by the printing apparatus is provided to an even channel comparator 14 in the even channel circuitry 4. Similarly, the odd count signal 12' produced by the odd channel counter 12 along with the desired print density signal 7 provided by the printing apparatus is provided to an odd channel comparator 16 in the odd channel circuitry 6. Each comparator 14, and 16 is 10 bits wide and produces therefrom an even comparator signal 14' or an odd comparator signal 16', respectively, which is indicative of the duration of the exposure or nonexposure of a specific pixel on the image recording medium. The comparator signal 14' or 16' is produced when the value of the count signal 10' or 12' represents the value of the desired print density signal 7; the desired print density being approximately a logarithmic function of the exposure or, alternatively, a logarithmic function of the count signal 10' or 12' generated by the counters 10, 12.

Figure 1B:
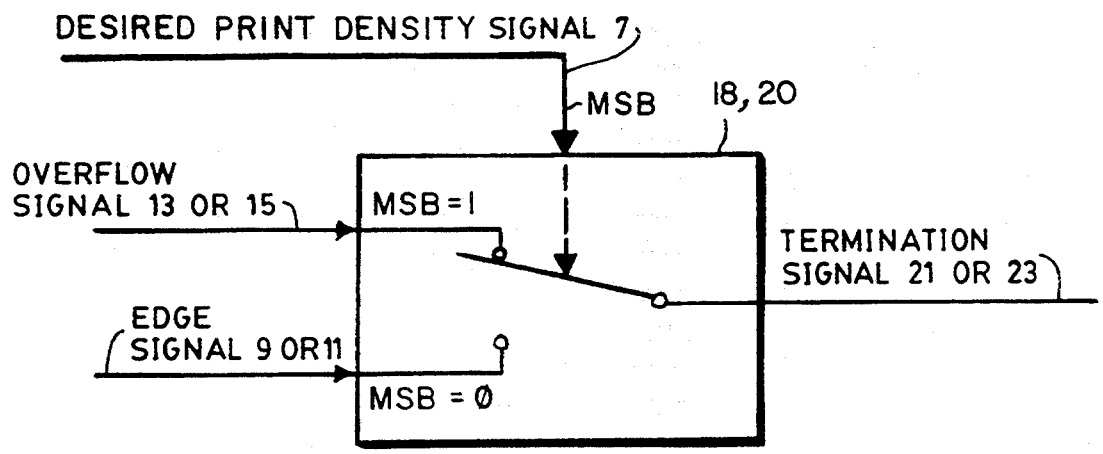
FIG. 1BH is an electrical diagram of one embodiment of the termination selector circuitry found in FIG. 1A.

The odd edge signal 9 generated by the spatial clock rising edge detector 8, the even overflow signal 15 generated by the even channel counter 10, and the most significant bit (MSB) from the desired print density signal 7 are provided to an even channel termination selector circuitry 18 in the even channel circuitry 4. Similarly, the even edge signal 11 generated by the spatial clock rising edge detector 8, the odd overflow signal 13 generated by the odd channel counter 12, and the most significant bit from the desired print density signal 7 are provided to an odd channel termination selector circuitry 20 in the odd channel circuitry 6. The termination selector circuitry 18, and 20 produces therefrom a termination signal 23 or 21, respectively. Specifically, referring to FIG. 1B, one embodiment for the termination selector 18, or 20 is shown. In this embodiment, the termination selector 18, or 20 acts as a switching element that is controlled by the most significant bit of the desired print density signal 7. That is, when the most significant bit of the desired print density signal 7 is equal to one, the termination signal 21 or 23 is equal to the overflow signal 13 or 15 while, if the most significant bit of the desired print density signal 7 is equal to zero, the termination signal 21 or 23 is equal to the edge signal 11 or 9, respectively.

A quantity known as the standard print density is particularly relevant to this invention. The standard print density is ideally at the minimum of dS/dE where S is the perceived lightness of the image captured on the image recording medium and E is the exposure of the image recording medium. The perceived lightness is a subjective psycho visual scale defined as an attribute of visual sensation whereby an illuminated area appears to exhibit more or less light in proportion to that exhibited by a reference area. Alternatively, the standard print density can also be represented as the value of C at the minimum of dS/dC where C is the count signal 10' or 12' generated by the counters 10, 12, respectively. In this embodiment, the ideal standard print density is approximated by one half of full exposure of a pixel and is represented in FIG. 1A by the most significant bit of the desired print density signal 7 which is sent to the termination selector circuitry 18, 20.

The even comparator signal 14' generated by the even channel comparator 14 along with the even termination signal 23 generated by the even channel termination selector circuitry 18 are provided to an R-S type even request flip-flop 22 in the even channel circuitry 4. Similarly, the odd comparator signal 16' generated by the odd channel comparator 16 along with the termination signal generated by the odd channel termination selector circuitry 20 are provided to an R-S type odd request flip-flop 24 in the odd channel circuitry 6. The request flip-flops 22, and 24 generate therefrom, respectively, an even request signal 27 and an odd request signal 29. Specifically, the assertion of the even or odd termination signal 23 and 21 causes the request flip-flop 22, or 24 to generate the even or odd channel request signal 27 or 29 and the assertion of the comparator signal 14' or 16' disables the channel request signal 27 or 29 respectively.

Figure 1C:
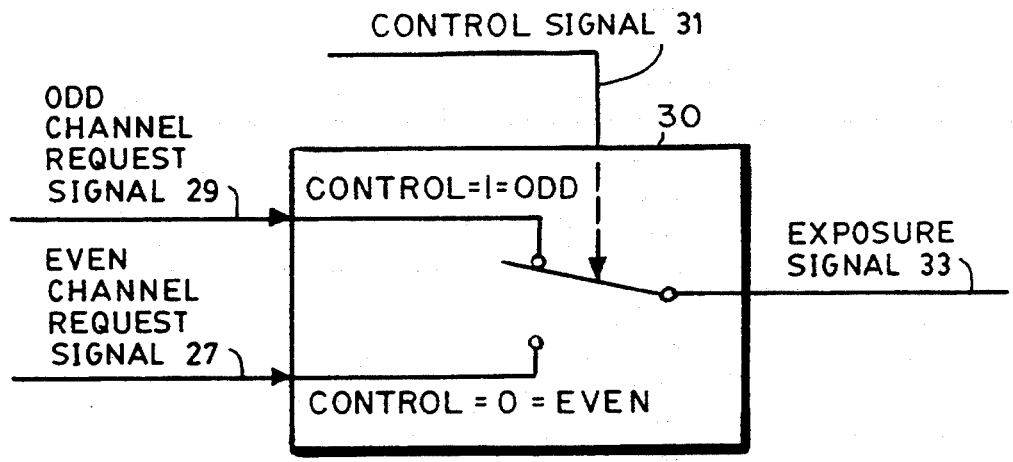
FIG. 1C is an electrical diagram of one embodiment of the data selector circuitry found FIG. 1A.

Selection circuitry 26 which is jointly shared by both the even channel circuitry 4 and the odd channel circuitry 6, then receives both termination signals 23, and 21 and both channel request signals 27, and 29 from, respectively, both termination selector circuitry 18, and 20 and both request flip-flops 22, and 24. The selection circuitry 26 is comprised of an R-S type control flip-flop 28 and a data selector 30. The control flip-flop 28 receives the termination signals 23 and 21 from both termination selector circuitry 18, and 20 and produces therefrom a control signal 31 which controls the enabling of the data selector 30. Specifically, the assertion of either termination signal 23 or 21 causes the control flip-flop 28 to switch the state of the control signal 31 to the opposite channel. From the control signal 31 and both channel request signals 27 and 29, the data selector 30 produces an exposure signal 33. Specifically, referring to FIG. 1C, one embodiment for the data selector 30 is shown. In this embodiment, the data selector 30 acts as a switching element that is controlled by the control signal 31. That is, when the control signal 31 is equal to one for the odd level, the exposure signal 33 is equal to the odd request signal 29 while, if the control signal 31 is equal to zero which is the even level, the exposure signal 33 is equal to the even request signal 27.

The exposure signal 33 generated by the data selector 30 is indicative of the intensity with which the exposing device 35 should irradiate the present pixel on the image recording device. The exposing device 35 in this embodiment is a laser diode, however, the exposing device 35 can be selected from the group comprising a light emitting diode, an shuttered arc lamp, a shuttered Xenon lamp, a shuttered gas laser, a solid state laser, and a semiconductor laser. Moreover, the image recording medium in this embodiment is a carbon based thermal medium and other examples for the image recording medium include dye based thermal medium and photochemical based medium.

DISCUSSION OF FIGS. 2-1 AND 2-2

Figures 1, 2:
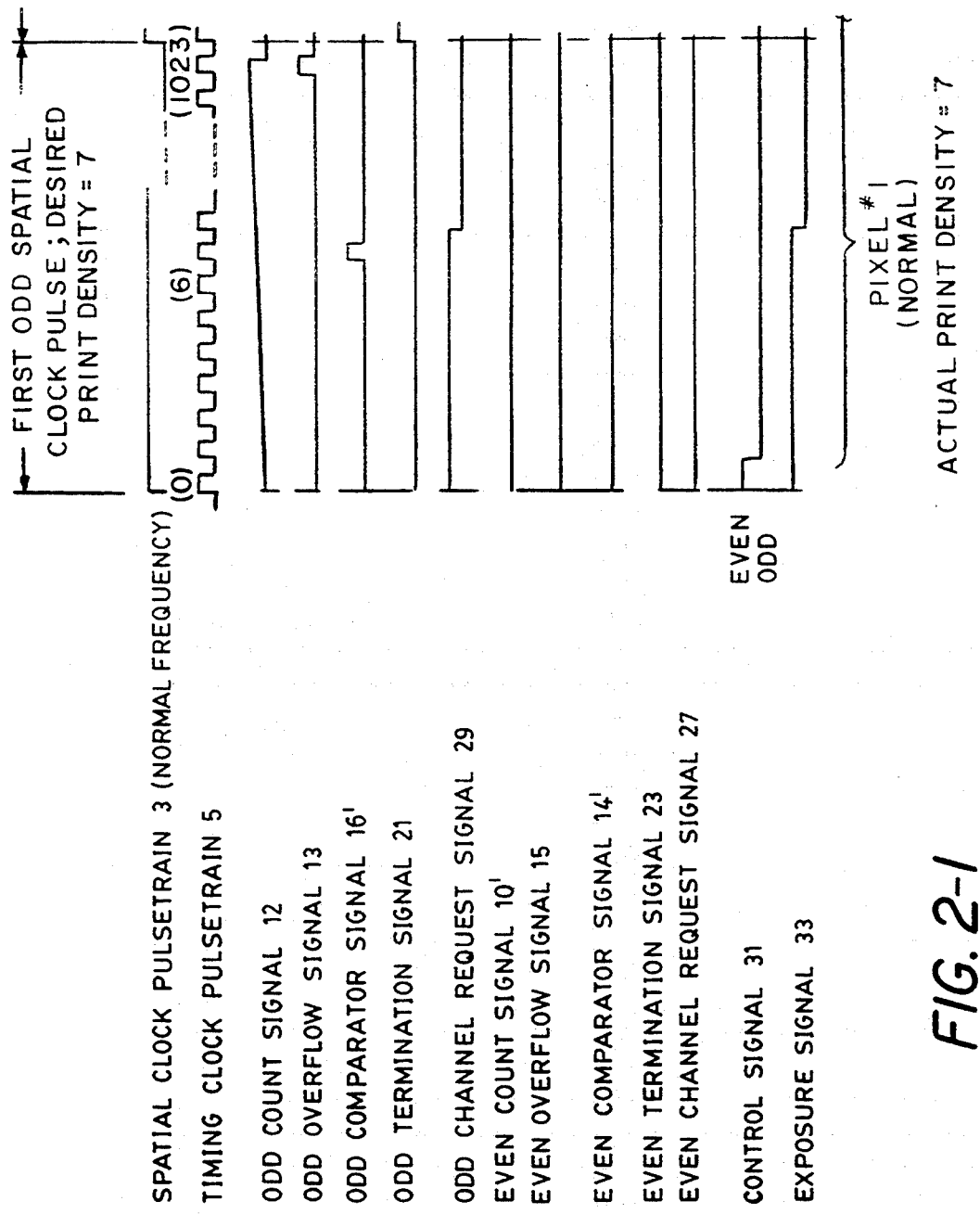
FIGS. 2-1 and 2-2 are waveform diagrams useful in explaining the steady state operation of the pixel synchronizer circuitry of FIG. 1A when the spatial clock is at a normal frequency.
Figure 2:
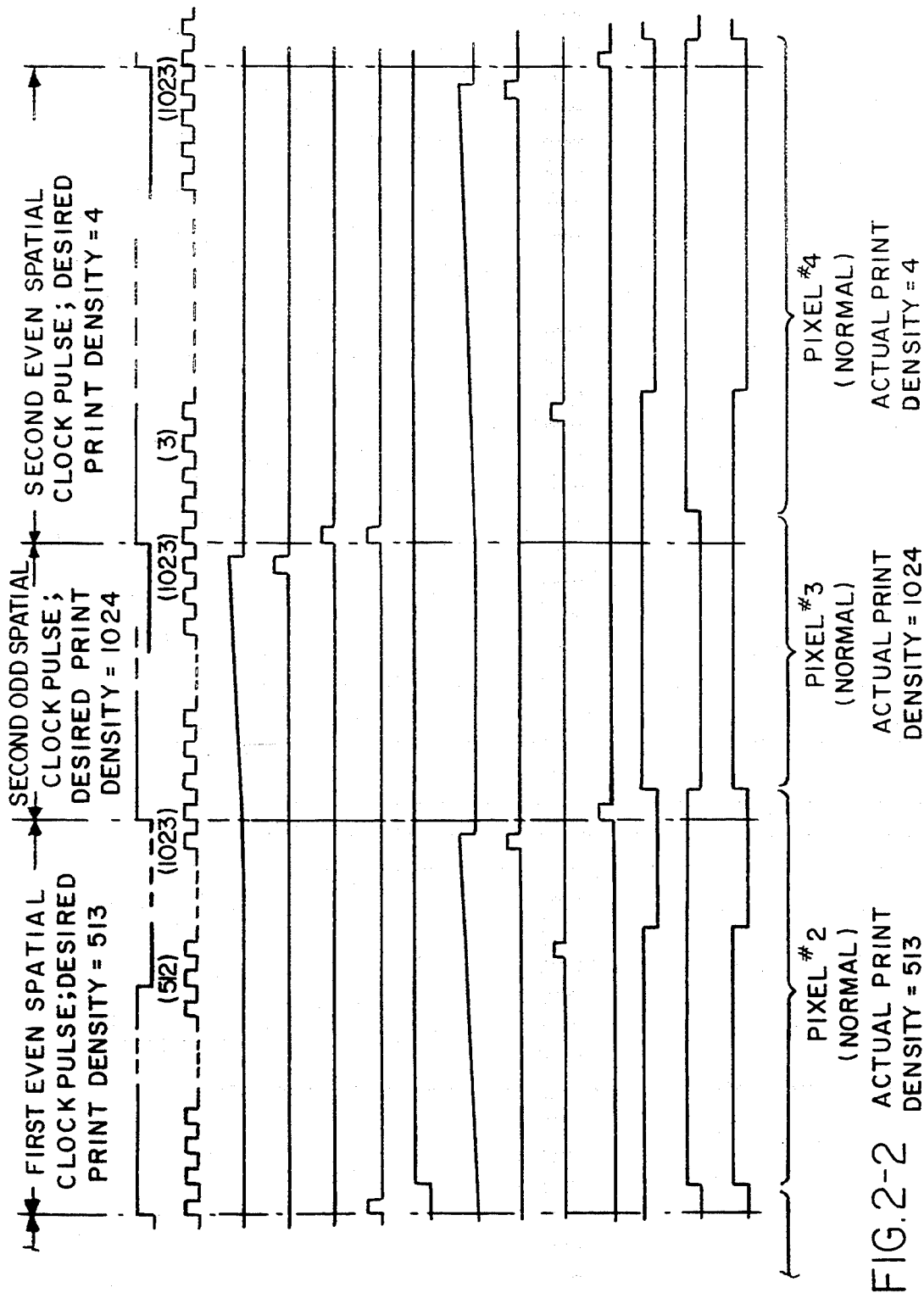

FIGS. 2-1 and 2-2 disclose several waveform diagrams useful in explaining the steady state operation of the data circuitry of FIG. 1A when the spatial clock 37 is at a normal frequency. That is, the normal frequency being when one spatial clock pulse exactly equals 1024 sequential timing clock pulses so that the exposing device 35 travels across the image recording medium at the correct velocity.

The spatial clock pulsetrain 3 of FIG. 1A is shown in FIGS. 2-1 and 2-2, being segmented into four spatial clock pulses where each spatial clock pulse has a desired print density and an actual print density associated therewith. The desired print density, represented by the desired print density signal 7, is the print density that the printing apparatus should expose onto the image recording medium while the actual print density is the print density that is actually exposed onto the image recording medium. Also, FIGS. 2-1, 2-2, 3-1, 3-2, 4-1 and 4-2 assume steady state conditions with an even pixel printing cycle of 1024 density at the normal frequency that ends just as each figure begins. Thus, the two request signals 27 and 29 and the exposure signal 33 are in the "high" or "1" state, the control signal 31 is about to switch from "Even" to "Odd", independently of anything in the figures, and all the remaining signals are assumed to be at the "low" or "0" state at the beginning of the first odd spatial clock pulse.

In FIG. 2-1, the first odd spatial clock pulse has associated therewith a desired pixel density of 7 and a pulsewidth that is equal to 1024 timing clock pulses. The rising edge of the first odd spatial clock pulse causes the spatial clock rising edge detector 8 to generate an odd edge signal 9 received by the 10 bit counter 12 in the odd channel circuitry 6 (see FIG. 1A). This allows the odd counter 12 to start counting the individual timing clock pulses and to produce an incrementally increasing odd count signal 12' shown in FIGS. 1A, 2-1, and 2-2. Although the odd and even count signals 12' and 10' are shown in FIGS. 2-1, 2-2, 3-1, 3-2, 4-1, and 4-2 as a ramp function, it should be understood that the odd and the even count signals 12' and 10' are, in fact, 10 bits wide and upcount from 0 to 1023 for the first through the $1024^{th}$ timing clock pulse, respectively. The ordinal numbers of the timing clock pulse is always greater than the cardinal numbers contained in the counters. With only 10 bits of resolution, it is impossible to express all the integral states between no exposure (0 counts) and full exposure (1024 counts) inclusive—one state must be excluded. This embodiment excludes the case of zero exposure and includes the case of exposing for all 1024 counts of the cycle. Thus, the exposure equals the ordinal number of timing clock pulse which causes the comparator 14 or 16 to generate the comparator signal 14' or 16', respectively, and not the cardinal number presented to the comparator 14 or 16. Accordingly, to request 7 units of exposure, the comparator 14 or 16 should be set to 6. For instance, when the odd count signal 12' reaches a count of six, the odd count signal 12' matches the desired print density for the first odd spatial clock pulse. Since this embodiment is synchronous the odd comparator 16 will assert the odd comparator signal 16 for one pulse duration of the eighth timing clock pulse.

The odd comparator signal 16' causes the odd request flip-flop 24 to switch the state of the odd request signal 16' from a "high" state to a "low" state at the ninth timing clock pulse as shown in FIG. 2. Since the control signal 31 is set to the "odd channel", the exposure signal 33 produced by the data selector 30 is controlled by the odd request signal 29. Accordingly, the exposure signal 33 changes from the "high" state which is associated with the exposing device 35 irradiating the image recording medium at full power to the "low" state which is associated with the exposing device 35 being shut off. The odd counter 12 continues counting the timing clock pulses and continues producing incrementally increasing odd count signals 12' until the 1024$^{th}$ timing clock pulse is counted. This causes the odd counter 12 to assert the odd overflow signal 13. The odd termination selector 20 receives the odd overflow signal 13 from the odd counter 12 but this has no effect on the odd termination selector 20 because the most significant bit of the desired print density is "0".

The rising edge of the first even spatial clock pulse causes the spatial clock rising edge detector 8 to generate an even edge signal 11 which is sent to the 10 bit counter 10 in the even channel circuitry 4 and to the odd termination selector 20. Since the desired print density from the first odd spatial clock pulse is still provided to the odd channel circuitry 6, the most significant bit of the desired print density provided to the odd termination selector 20 is still a "0". The combination of the most significant bit of the desired print density being "0" and the assertion of the even edge signal 11 will cause the termination selector 20 (FIG.1B) to assert the odd termination signal 21 on the first timing clock pulse of the first even spatial clock pulse. The assertion of the odd termination signal 21 causes the odd request flip-flop 24 to change the state of the odd request from the "low" state to the "high" state and also causes the control flip-flop 28 in the selection circuitry 26 to change the control signal 31 from the "odd channel" to the "even channel". Since the even request signal 27 is in the "high" state, the exposure signal 33 will change from the "low" state to the "high" state and, correspondingly, the exposing device 35 will begin irradiating the image recording medium with full intensity.

This completes the pixel print cycle associated with the first odd spatial clock pulse and, as shown in FIG. 2-1, this pixel print cycle has been labeled "Pixel #1". A pixel print cycle is defined as the period that the exposing device 35 exposes a single pixel on the image recording medium and for purposes of this embodiment it is defined as the period required for the control signal 31 to make the transition from the "even" state to the "odd" state or from the "odd" state to the "even" state. Applying this definition here, Pixel #1 has a period or width associated therewith that is equal to 1024 timing clock pulses and, accordingly, Pixel #1 has a "normal" width. That is, Pixel #1 has been disposed onto the image recording medium without being either compressed or stretched. Also, Pixel #1 has been disposed onto the image recording medium with an actual print density of 7 which corresponds exactly with the desired print density.

The even edge signal 11 provided to the even counter 10 in the even channel circuitry 4 causes the even counter 10 to start counting the timing clock pulses and to start generating incrementally increasing even count signals 10' as shown for the first even spatial clock pulse in FIG. 2-2. When the even count signal 10' reaches a count of 512, which equals the value associated with the desired print density of the first even spatial clock pulse, the even comparator 14 on the 515$^{th}$ timing clock pulse will assert the even comparator signal 14' for one timing clock pulse. The even comparator signal 14' causes the even request flip-flop 22 to switch the state of the even request signal 27 from the "high" state to the "low" state at the 515$^{th}$ timing clock pulse. Since the exposure signal 33 follows the even request signal 27, the state of the exposure signal 33 is set to the "low" state. The even counter 10 continues counting the timing clock pulses and continues producing an incrementally increasing even count signal 10' until the 1024$^{th}$ timing clock pulse is counted. This causes the even counter 10 to assert the even overflow signal 15. The even termination selector 18 receives the even overflow signal 15 which causes it to assert the even termination signal 23 on the first timing clock pulse of the second odd spatial clock pulse. The assertion of the even termination signal 23 causes the even request flip-flop 22 to change the state of the even request signal 27 to the "high" state and also causes the control flip-flop 28 to change the control signal 31 from the "even channel" to the "odd channel". Since the odd request signal 29 was left in the "high" state at the end of the first odd spatial clock pulse, the exposure signal 33 will change from the "low" state to the "high" state and the odd request signal 29 will control the exposure signal 33.

This completes the pixel print cycle associated with the first even spatial clock pulse and this pixel print cycle has been labeled in FIG. 2-2 as "Pixel #2". Pixel #2 has a "normal" width associated therewith and has an actual print density of 513 which corresponds exactly with the desired print density for the first even spatial clock pulse.

The third spatial clock pulse, labeled the second odd spatial clock pulse in FIG. 2-2, is sent to the spatial clock rising edge detector 8 which causes it to generate an odd edge signal 9 to the odd counter 12. The odd counter 12 starts counting the individual timing clock pulses and starts producing the incrementally increasing odd count signal 12'. When the odd count of the odd count signal 12' reaches a count of 1023, the odd count signal 12' equals the desired print density of the second odd spatial clock pulse and so the odd comparator 16 on the first timing clock pulse of the second even spatial clock pulse will assert the odd comparator signal 16' for one timing clock pulse. The odd count reaching the count of 1023 also causes the odd counter 12 to assert the odd overflow signal 13. The odd termination selector 20 receives the odd overflow signal 13 and produces therefrom an odd termination signal 21 on the first timing clock pulse of the second even spatial clock pulse. The odd comparator signal 16' causes the odd request flip-flop 24 to change the state of the odd request signal 29 to the "low" state but soon thereafter the odd termination signal 21 causes the odd request flip-flop 24 to change, yet again, the state of the odd request signal 29 to the "high" state. Accordingly, the odd request signal 29 never appears to have changed states. The odd termination signal 21 also causes the control flip-flop 28 to change the state of the control signal 31 from the "odd channel" to the "even channel". Since the even request signal 27 was left in the "high" state at the end of the first even spatial clock pulse, the exposure signal 33 will remain at the "high" state and the even request signal 27 will now control the exposure signal 33.

This completes the pixel print cycle associated with the second odd spatial clock pulse as shown in FIG. 2-2. This pixel print cycle has been labeled "Pixel #3". Pixel #3 has a "normal" width associated therewith and has an actual print density of 1024 which corresponds exactly with the desired print density for the second odd spatial clock pulse.

The rising edge of the fourth spatial clock pulse, labeled the second even spatial clock pulse in FIG. 2-2, causes the spatial clock rising edge detector 8 to generate an even edge signal 11 to the even counter 10. This allows the even counter 10 to start counting the individual timing clock pulses and to start producing an incrementally increasing even count signal 10'. When the even count signal 10' reaches a count of three, the even count signal 10' equals the desired print density for the second even spatial clock pulse and so the even comparator 14 on the fifth timing clock pulse will assert the even comparator signal 14' for one timing clock pulse. The even comparator signal 14' causes the even request flip-flop 22 to switch the state of the even request signal 27 to the "low" state at the sixth timing clock pulse. Since the control signal 31 is set to the "even channel", the exposure signal 33 changes from the "high" state to the "low" state. The even counter 12 continues counting the timing clock pulses and continues producing an incrementally increasing even count signal 10 until the 1024$^{th}$ timing clock pulse is counted. The counting of the 1024$^{th}$ timing clock pulse causes the even counter 10 to assert the even overflow signal 15. The even termination selector 18 receives the even overflow signal 15 but this has no effect on the even termination selector 18 because the most significant bit of the desired print density is "0".

The rising edge of the third odd spatial clock pulse causes the spatial clock rising edge detector 8 to generate an odd edge signal 9 to the even termination selector 18 and the odd counter 12. The combination of the most significant bit of the second even spatial clock pulse being "0" and the assertion of the odd edge signal 9 causes the termination selector 20 (FIG. 1B) to assert the even termination signal 23 on the first timing clock pulse of the third odd spatial clock pulse. The assertion of the even termination signal 23 causes the even request flip-flop 22 to change the state of the even request signal 27 from the "low" state to the "high" state and also causes the control flip-flop 28 to change the exposure signal 33 from the "even channel" to the "odd channel". Since the odd request signal 29 was left in the "high" state at the end of the second odd spatial clock pulse, the exposure signal 33 will change to the "high" state and the odd request signal 29 will now control the exposure signal 33.

This completes the pixel print cycle associated with the second even spatial clock pulse as shown in FIG. 2-2. This pixel print cycle has been labeled "Pixel #4". Pixel #4 has a "normal" width associated therewith and has an actual print density of 4 which corresponds exactly with the desired print density for the second even spatial clock pulse.

DISCUSSION OF FIGS. 3-1 AND 3-2

Figures 1, 3:
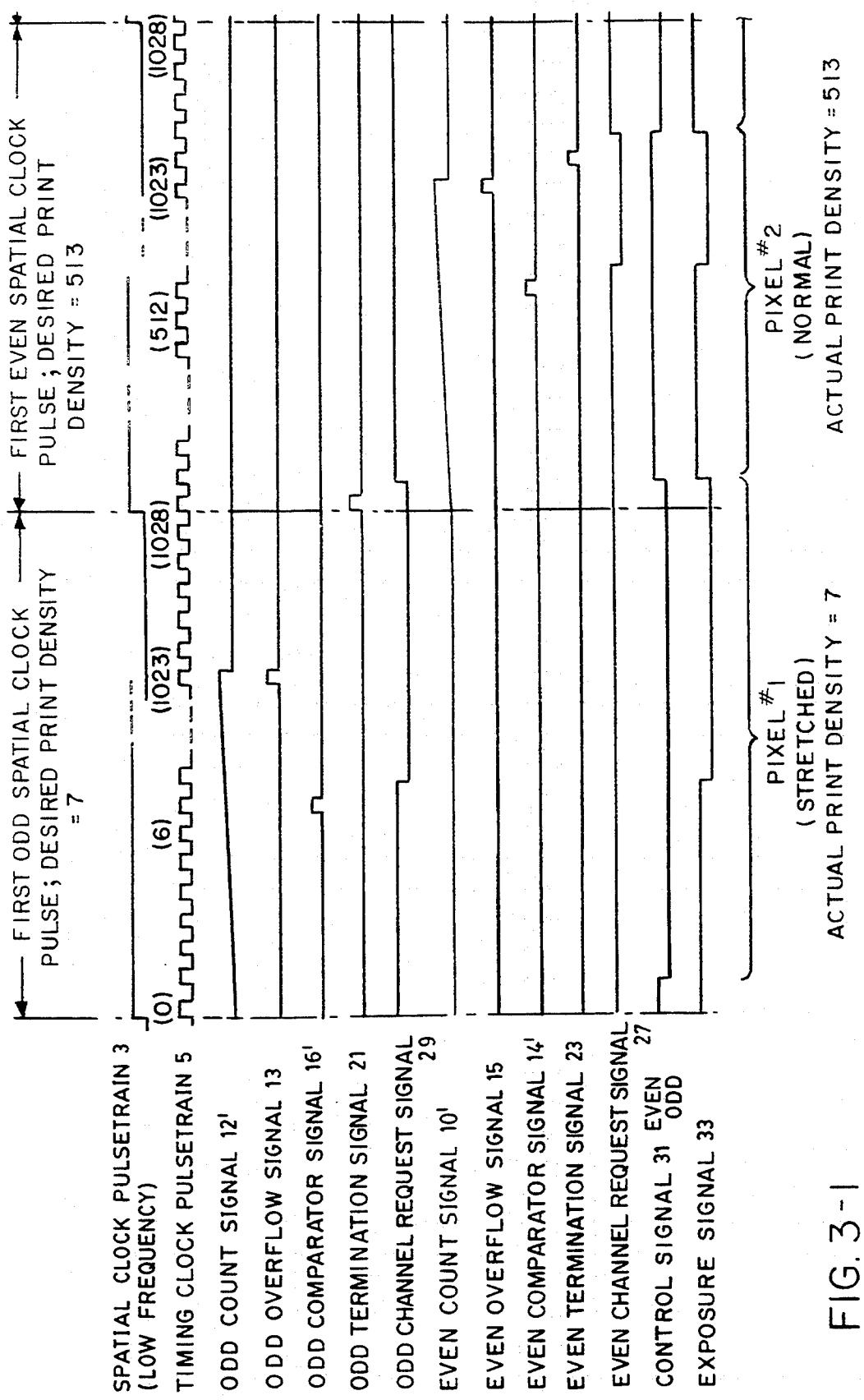
Figures 2, 3:
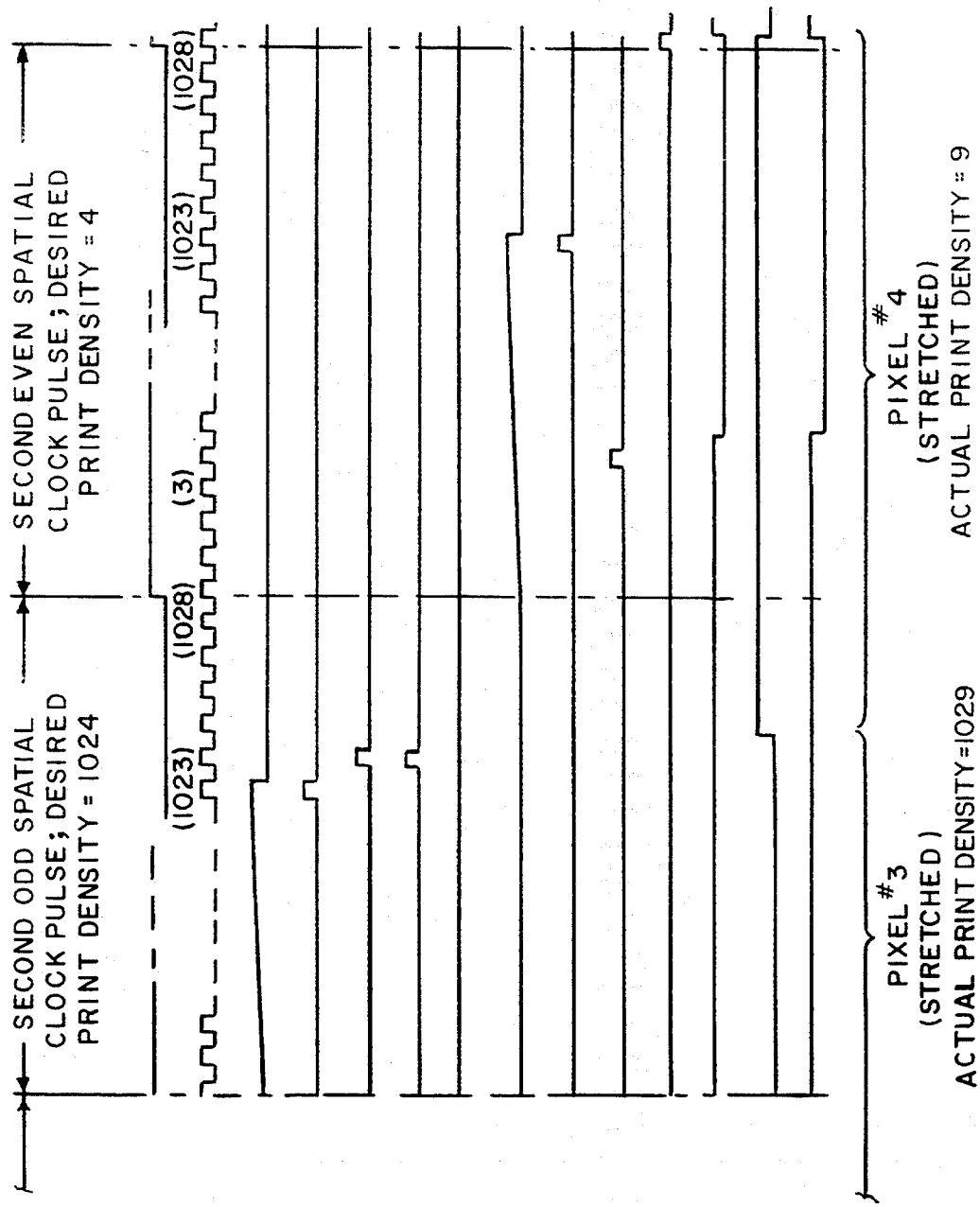

FIG. 3-1 and 3-2 disclose several waveform diagrams useful in explaining the steady state operation of the data circuitry of FIG. 1A when the spatial clock 37 is at a low frequency, that is, one spatial clock pulse is greater than 1024 sequential timing clock pulses so that the exposing device 35 travels too slowly across the image recording medium. FIGS. 3-1 and 3-2 have been segmented into four spatial clock pulses where each spatial clock pulse has a desired print density and an actual print density associated therewith. The desired print density associated with each spatial clock pulse in FIGS. 3-1 and 3-2 is the same as the desired print density associated with each spatial clock pulse in FIGS. 2-1 and 2-2. Also, the initial conditions for FIGS. 3-1 and 3-2 are the same as in FIG. 2-1 and 2-2.

Referring now to FIG. 3-1, the rising edge of the first odd spatial clock pulse causes the spatial clock rising edge detector 8 to generate an odd edge signal 9 to the odd counter 12 which allows the odd counter 12 to start counting the individual timing clock pulses and to produce an incrementally increasing odd count signal 12'. When the odd count signal 12' reaches a count of six, the odd count signal 12' equals the desired print density for the first odd spatial clock pulse and so the odd comparator 16 on the eighth timing clock pulse will assert the odd comparator signal 16' for one timing clock pulse. The odd request flip-flop 24 switches the state of the odd request signal 29 from the "high" state to the "low" state at the ninth timing clock pulse. Since the control signal 31 is set to the "odd channel", the exposure signal 33 produced by the data selector 30 is controlled by the odd request signal 29. Accordingly, the exposure signal 33 changes from the "high" state to the "low" state. The odd counter 12 continues counting the timing clock pulses and continues producing incrementally increasing odd count signals until the 1024$^{th}$ timing clock pulse is counted. This causes the odd counter 12 to assert the odd overflow signal 13. The odd termination selector 20 receives the odd overflow signal 13 from the odd counter 12 but this has no effect on the odd termination selector 20. Timing clock pulses 1024 through 1028 in the first odd spatial clock pulse then occur but they are not counted by the odd channel circuitry 6.

The rising edge of the first even spatial clock pulse occurs after the 1029$^{th}$ timing clock pulse which causes the spatial clock rising edge detector 8 to generate an even edge signal 11 which is sent to the even counter 10 and to the odd termination selector 20. Since the desired print density from the first odd spatial clock pulse is still provided to the odd channel circuitry 6, the most significant bit of the desired print density provided to the odd termination selector 20 is still a "0". The combination of the most significant bit of the first odd spatial clock pulse being "0" and the assertion of the even edge signal 11 will cause the termination selector 20 (FIG. 1B) to assert the odd termination signal 21 on the first timing clock pulse of the first even spatial clock pulse. The assertion of the odd termination signal 21 causes the odd request flip-flop 24 to change the state of the odd request from the "low" state to the "high" state and also causes the control flip-flop 28 to change the control signal 31 from the "odd channel" to the "even channel". Since, as shown in FIG. 3-1, the even request signal 27 is in the "high" state, the exposure signal 33 will change from the "low" state to the "high" state.

This completes the pixel print cycle associated with the first odd spatial clock pulse and, as shown in FIG. 3-1, this pixel print cycle has been labeled "Pixel #1". Pixel #1 has a width associated therewith that is equal to 1029 timing clock pulses which is greater than the 1024 timing clock pulses associated with a "normal" pixel width. Accordingly, Pixel #1 has a "stretched" width. Also, Pixel #1 has been disposed onto the image recording medium with an actual print density of 7 which corresponds exactly with the desired print density.

The even edge signal 11 provided to the even counter 10 for the first even spatial clock pulse of FIG. 3-1 causes the even counter 10 to start counting the timing clock pulses and start generating incrementally increasing even count signals 10'. When the even count signal 10' reaches a count of 512, which equals the value associated with the desired print density of the first even spatial clock pulse, the even comparator 14 on the 514$^{th}$ timing clock pulse will assert the even comparator signal 14' for one timing clock pulse. The even comparator signal 14' causes the even request flip-flop 22 to switch the state of the even request signal 27 from the "high" state to the "low" state at the 515$^{th}$ timing clock pulse. Since the exposure signal 33 follows the even request signal 27, the state of the exposure signal 33 is set to the "low" state. The even counter 10 continues counting the timing clock pulses and continues producing an incrementally increasing even count signal 10' until the 1024$^{th}$ timing clock pulse is counted. This causes the even counter 10 to assert the even overflow signal 15. The even termination selector 18 receives the even overflow signal 15 which causes it to assert the even termination signal 23 on the 1025$^{th}$ timing clock pulse of the first even spatial clock pulse. The assertion of the even termination signal 23 causes the even request flip-flop 22 to change the state of the even request signal 27 to a "high" state and also causes the control flip-flop 28 to change the control signal 31 from the "even channel" to the "odd channel". Since the odd request signal 29 was left in the "high" state at the end of the first odd spatial clock pulse, the exposure signal 33 will change from the "low" state to the "high" state and the exposing device 35 will expose the image recording medium at full intensity between the 1026$^{th}$ and the 1029$^{th}$ timing clock pulses in the first even spatial clock pulse.

This completes the pixel print cycle associated with the first even spatial clock pulse as shown in FIG. 3-1. This pixel print cycle has been labeled "Pixel #2". Pixel #2 has a "normal" width of 1024 timing clock pulses and has an actual print density of 513 which corresponds exactly with the desired print density for the first even spatial clock pulse.

The third spatial clock pulse, labeled the second odd spatial clock pulse in FIG. 3-2, is sent to the spatial clock rising edge detector 8 which causes it to generate an odd edge signal 9 to the odd counter 12. The odd counter 12 starts counting the individual timing clock pulses and starts producing the incrementally increasing odd count signal 12'. When the odd count signal 12' reaches a count of 1023, the odd count signal 12' equals the desired print density of the second odd spatial clock pulse and so the odd comparator 16 on the 1025$^{th}$ timing clock pulse of the second odd spatial clock pulse will assert the odd comparator signal 16' for one timing clock pulse. When the odd count of the odd count signal 12' reaches the count of 1023, this also causes the odd counter 12 to assert the odd overflow signal 13. The odd termination selector 20 receives the odd overflow signal 13 and produces therefrom an odd termination signal 21 on the 1025$^{th}$ clock pulse of the second odd spatial clock pulse. The odd overflow signal 13 causes the odd request flip-flop 24 to change the state of the odd request signal 29 to the "low" state but immediately thereafter the odd termination signal 21 causes the odd request flip-flop 24 to change, yet again, the state of the odd request signal 29 to the "high" state. Accordingly, the odd request signal 29 never appears to have changed states. The odd termination signal 21 also causes the control flip-flop 28 to change the state of the control signal 31 from the "odd channel" to the "even channel". Since the even request signal 27 was left in the "high" state at the end of the first even spatial clock pulse, the exposure signal 33 will remain at the "high" state through the 1025$^{th}$ timing clock pulse in the second odd spatial clock pulse.

This completes the pixel print cycle associated with the second odd spatial clock pulse as shown in FIG. 3-2. This pixel print cycle has been labeled "Pixel #3". Pixel #3 has a "stretched" width associated therewith and has an actual print density of 1029 which is larger than the desired print density for the second odd spatial clock pulse. This occurs because Pixel #3 also includes the 1026$^{th}$ through the 1029$^{th}$ timing clock pulses of the first even spatial clock pulse. Since a pixel print cycle is defined as the period required for the control signal 31 to make the transition from the "Even" state to the "Odd" state or from the "Odd" state to the "Even" state, Pixel #2 must end at and Pixel #3 must start on the 1026$^{th}$ timing clock pulse of the first even spatial clock pulse.

Pixel #3 also includes the 1026$^{th}$ through the 1029$^{th}$ timing clock pulses of the first even spatial clock pulse for a far more important reason. The preferred image recording medium for use with this embodiment of this invention is a carbon based medium which is normally transparent but which turns to darker shades of the grey scale as it is irradiated with increased light intensity. Since this carbon based thermal medium is intended to be used as a transparency, the human visual system can much more easily identify "pin hole" transparent regions in a dark field rather than a grey scale shift to a darker shade in an already dark field. Although the 1026$^{th}$ through the 1029$^{th}$ timing clock pulses in the first spatial clock pulse do produce an artifact, this type of artifact is much less distinguishable to the human visual system than the alternative pin hole artifact.

It should be obvious to one skilled in the art that many different types of image recording mediums can be used in conjunction with this invention and that minor modifications to the circuitry discussed in FIG. 1A might also be necessary in order for the circuitry in FIG. 1A to be optimized for use with a specific image recording medium. These modifications to the circuitry shown in FIG. 1A, however, are obvious to one of ordinary skill in the art. These modifications are also specific to a specific image recording medium, are much to numerous to discuss individually, and accordingly will not be discussed here.

The rising edge of the fourth spatial clock pulse, labeled the second even spatial clock pulse as shown in FIG. 3-2, causes the spatial clock rising edge detector 8 to generate an even edge signal 11 to the even counter 10. This allows the even counter 10 to start counting the individual timing clock pulses and to start producing an incrementally increasing even count signal 10'. When the even count signal 10' reaches a count of three, the even count signal 10' equals the desired print density for the second even spatial clock pulse and so the even comparator 14 on the fifth timing clock pulse will assert the even comparator signal 14' for one timing clock pulse. The even comparator signal 14' causes the even request flip-flop 22 to switch the state of the even request signal 27 to the "low" state at the sixth timing clock pulse. Since the control signal 31 is set to the "even channel", the exposure signal 33 changes from the "high" state to the "low" state. The even counter 12 continues counting the timing clock pulses and continues producing an incrementally increasing even signal count signal 10' until the 1024$^{th}$ timing clock pulse is counted. The counting of the 1024$^{th}$ timing clock pulse causes the even counter 10 to assert the even overflow signal 15. The even termination selector 18 receives the even overflow signal 15 but this has no effect on the even termination selector 18 because the most significant bit of the desired print density is "0". Timing clock pulses 1024 through 1028 in the second even spatial clock pulse then occur but they are not counted by the even channel circuitry 4.

The rising edge of the third odd spatial clock pulse causes the spatial clock rising edge detector 8 to generate an odd edge signal 9 to the even termination selector 18 and the odd counter 12. The combination of the most significant bit of the second even spatial clock pulse being "0" and the assertion of the odd edge signal 9 causes the termination selector 18 (FIG. 1B) to assert the even termination signal 23 on the first timing clock pulse of the third odd spatial clock pulse. The assertion of the even termination signal 23 causes the even request flip-flop 22 to change the state of the even request signal 27 from the "low" state to the "high" state and also causes the control flip-flop 28 to change the exposure signal 33 from the "even channel" to the "odd channel". Since the odd request signal 29 was left in the "high" state at the end of the second odd spatial clock pulse, the exposure signal 33 will switch to the "high" state and the odd request signal 29 will now control the exposure signal 33.

This completes the pixel print cycle associated with the second even spatial clock pulse as shown in FIG. 3-2. This pixel print cycle has been labeled "Pixel #4". Pixel #4 has a "stretched" width associated therewith and has an actual print density of 9. The actual print density associated with Pixel #4 differs from the desired print density associated with the second even spatial clock pulse because all of the accumulated errors produced by the data circuitry 2 arc disposed into Pixel #4. The accumulated errors are all the errors associated with the data circuitry 2 sequentially exposing individual adjacent pixel locations on the image recording medium with an exposing device 35 that is traveling too slow or too fast across the image recording medium. The reason why the accumulated errors are disposed into Pixel #4 is quite simple, the human visual system has a hard time perceiving the accumulated error when it is disposed in Pixel #4. The human visual system is hard pressed to distinguish any minor grey scale errors in the color of adjacent pixels when the colors associated with the adjacent pixels are at or near the opposite ends of the grey scale. In FIGS. 3-1 and 3-2 using the preferred carbon based thermal medium as the image recording medium, the desired pixel density associated with Pixel #3 represents a very dark grey color while the desired pixel density associated with Pixel #4 represents a very light grey color. The transition between the dark grey color of Pixel #3 to the light grey color of Pixel #4 produces a distinct visible edge. The human visual system is hard pressed to distinguish any minor grey scale errors in the colors of the adjacent pixels, namely, Pixel #3 and Pixel #4, which make up the distinct visible edge. Accordingly, the data circuitry 2 in FIG. 1A disposes all the accumulated errors due to the data circuitry operating under a slow or a fast spatial clock frequency into the later of the two adjacent pixels that produce the distinct visible edge, namely, into Pixel #4. It should also be obvious to one skilled in the art that the data circuitry 2 in FIG. 1A could also be modified such that the accumulated errors due to the data circuitry 2 operating under high or a low spatial clock frequency could be disposed in the former of the two adjacent pixels that produce the distinct visible edge, namely, into Pixel #3 by merely redefining the pixel boundaries.

DISCUSSION OF FIGS. 4-1 AND 4-2

Figures 1, 4:
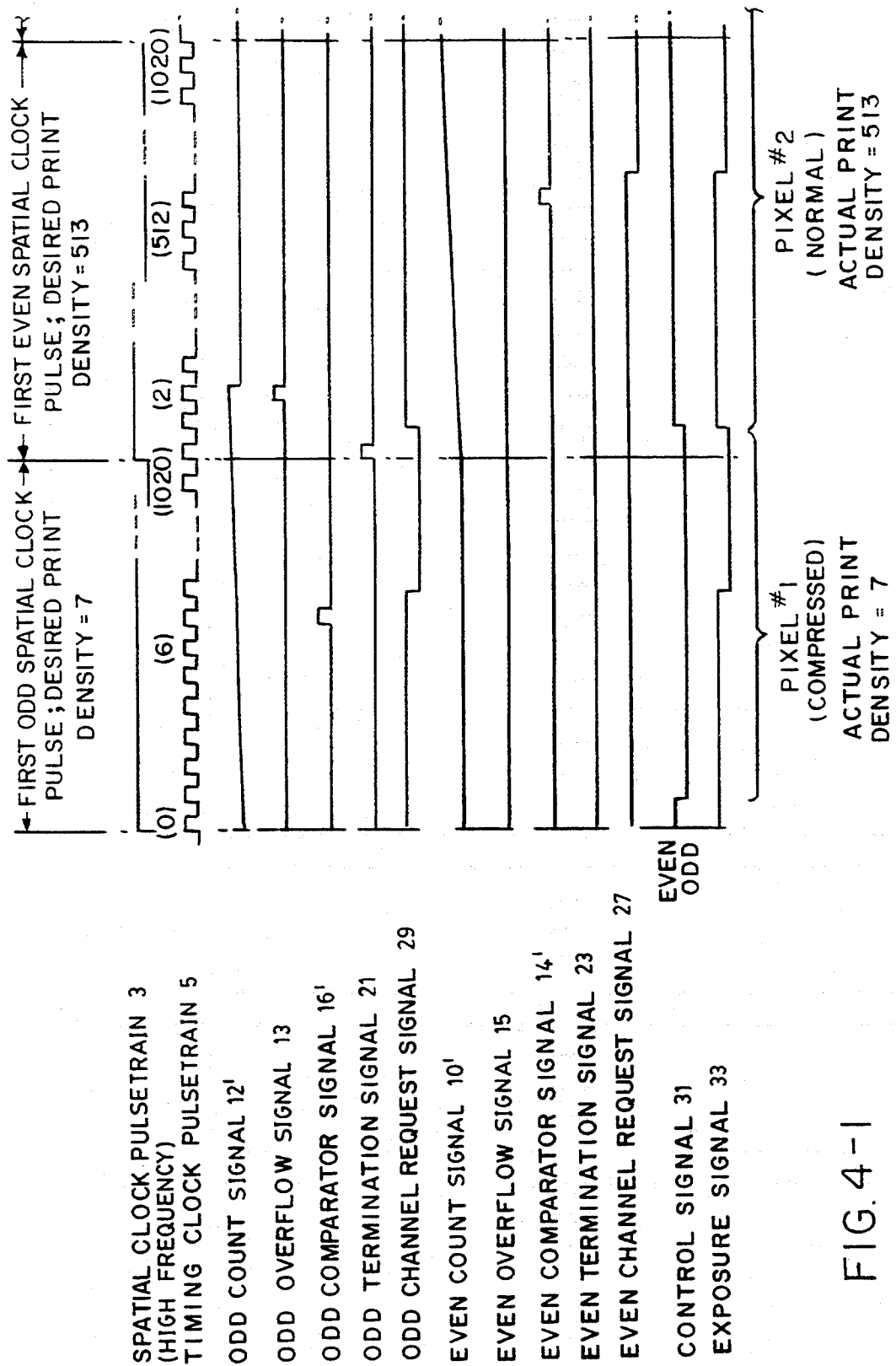
Figures 2, 4:
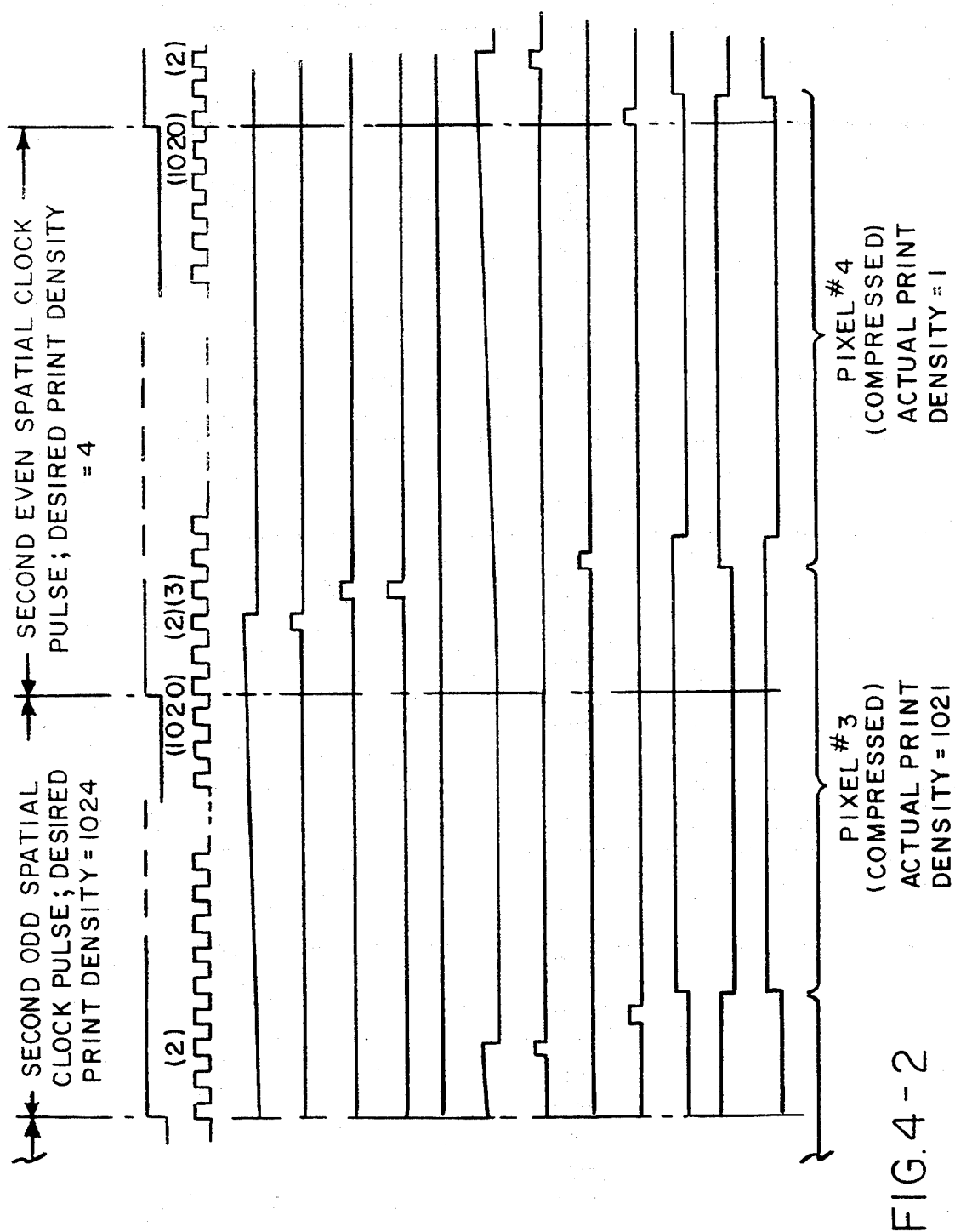

FIGS. 4-1 and 4-2 disclose several waveform diagrams useful in explaining the steady state operation of the data circuitry of FIG. 1A when the spatial clock 37 is at a high frequency, that is, one spatial clock pulse is less than 1024 sequential timing clock pulses so that the exposing device 35 travels too fast across the image recording medium. Like FIGS. 2-1, 2-2, 3-1, and 3-2, FIGS. 4-1 and 4-2 have been segmented into four spatial clock pulses and each spatial clock pulse has a desired print density and an actual print density associated therewith. The desired print density associated with each spatial clock pulse in FIGS. 4-1 and 4-2 is the same as the desired print density associated with each spatial clock pulse in FIGS. 2-1, 2-2, 3-1, and 3-2. Also, the initial conditions for FIGS. 4-1 and 4-2 are the same as in FIGS. 2-1, 2-2, 3-1, and 3-2.

Referring now to FIG. 4-1, the rising edge of the first odd spatial clock pulse causes the spatial clock rising edge detector 8 to generate an odd edge signal 9 to the odd counter 12 which allows the odd counter 12 to start counting the individual timing clock pulses and to produce an incrementally increasing odd count signal 12'. When the odd count signal 12' reaches a count of six, the odd count signal 12' equals the desired print density for the first odd spatial clock pulse and so the odd comparator 16 on the eighth timing clock pulse will assert the odd comparator signal 16' for one timing clock pulse. The odd request flip-flop 24 switches the state of the odd request signal 29 from the "high" state to the "low" state at the ninth timing clock pulse. Since the control signal 31 is set to the "odd channel", the exposure signal 33 produced by the data selector 30 is controlled by the odd request signal 29. Accordingly, the exposure signal 33 changes from the "high" state to the "low" state. The odd counter 12 continues counting the timing clock pulses and continues producing incrementally increasing odd count signal 12' until the $1024^{th}$ timing clock pulse after the rising edge of the first odd spatial clock pulse or, alternatively, until the $3^{rd}$ timing clock pulse in the first even spatial clock pulse.

The rising edge of the first even spatial clock pulse occurs after the $1021^{st}$ timing clock pulse which causes the spatial clock rising edge detector 8 to generate an even edge signal 11 which is sent to the even counter 10 and to the odd termination selector 20. Since the desired print density from the first odd spatial clock pulse is still provided to the odd channel circuitry 6, the most significant bit of the desired print density provided to the odd termination selector 20 is still a "0". The combination of the most significant bit of the first odd spatial clock pulse being "0" and the assertion of the even edge signal 11 will cause the termination selector 20 (FIG. 1B) to assert the odd termination signal 21 on the first timing clock pulse of the first even spatial clock pulse. The assertion of the odd termination signal 21 causes the odd request flip-flop 24 to change the state of the odd request signal 21 from the "low" state to the "high" state and also causes the control flip-flop 28 to change the control signal 31 from the "odd channel" to the "even channel". Since the even request signal 27 is in the "high" state, the exposure signal 33 will change from the "low" state to the "high" state. The odd count continues counting sequential timing clock pulses until 1024 timing clock pulses after the rising edge of the first odd spatial clock pulse which corresponds with the $3^{rd}$ timing clock pulse in the first even spatial clock pulse.

The 3<sup>rd</sup> timing clock pulse in the first even spatial clock pulse causes the odd counter 12 to assert the odd overflow signal 13 which is associated with the first odd spatial clock. The odd termination selector 20 receives the odd overflow signal 13 associated with the first odd spatial clock pulse but this has no effect on the odd termination selector 20.

This completes the pixel print cycle associated with the first odd spatial clock pulse and, as shown in FIG. 4-1, this pixel print cycle has been labeled "Pixel #1". Pixel #1 has a width associated therewith that is equal to 1021 timing clock pulses which is less than the 1024 timing clock pulses associated with a "normal" pixel width. Accordingly, Pixel #1 has a "compressed" width. Also, Pixel #1 has been disposed onto the image recording medium with an actual print density of 7 which corresponds exactly with the desired print density.

The even edge signal 11 provided to the even counter 10 in the even channel circuitry 4 causes the even counter 10 to start counting the timing clock pulses and to start generating incrementally increasing even count signals 10′. When the even count signal 10′ reaches a count of 512, which equals the value associated with the desired print density of the first even spatial clock pulse, the even comparator 14 on the 514<sup>th</sup> timing clock pulse will assert the even comparator signal 14′ for one timing clock pulse. The even comparator signal 14′ causes the even request flip-flop 22 to switch the state of the even request signal 27 from the "high" state to the "low" state at the 515<sup>th</sup> timing clock pulse. Since the exposure signal 33 follows the even request signal 27, the state of the exposure signal 33 is set to the "low" state. The even counter 10 continues counting the timing clock pulses and continues producing an incrementally increasing even count signal 10′ until the 3<sup>r</sup> timing clock pulse in the second odd spatial clock pulse. The 3<sup>rd</sup> timing clock pulse causes the even counter 10 to assert the even overflow signal 15. The even termination selector 18 receives the even overflow signal 15 which causes it to assert the even termination signal 23 on the fourth timing clock pulse of the second odd spatial clock pulse. The assertion of the even termination signal 23 causes the even request flip-flop 22 to change the state of the even request signal 27 to a "high" state and also causes the control flip-flop 28 to change the control signal 31 from the "even channel" to the "odd channel". Since the odd request signal 29 was left in the "high⇌" state at the end of the first odd spatial clock pulse, the exposure signal 33 will change from the "low" state to the "high" state and the odd request signal 29 will control the exposure signal 33 on the fifth timing clock pulse in the second odd spatial clock pulse.

This completes the pixel print cycle associated with the first even spatial clock pulse as shown in FIG. 4-1. This pixel print cycle has been labeled "Pixel #2". Pixel #2 has a "normal" width associated therewith and has an actual print density of 513 which corresponds exactly with the desired print density for the first even spatial clock pulse.

The third spatial clock pulse, labeled as the second odd spatial clock pulse in FIG. 4-2, is sent to the spatial clock rising edge detector 8 which causes it to generate an odd edge signal 9 to the odd counter 12. The odd counter 12 starts counting the individual timing clock pulses and starts producing the incrementally increasing odd count signal 12′. When the odd count signal 12′ reaches a count of 1023 which is the 3<sup>rd</sup> timing clock pulse in the second even spatial clock pulse, the odd count signal 12′ equals the desired print density of the second odd spatial clock pulse and so the odd comparator 16 on the fourth timing clock pulse of the second even spatial clock pulse will assert the odd comparator signal 16′ for one timing clock pulse. When the odd count signal 12′ reaches the count of 1023, this also causes the odd counter 12 to assert the odd overflow signal 13. The odd termination selector 20 receives the odd overflow signal 13 and produces therefrom an odd termination signal 21 on the fourth timing clock pulse of the second even spatial clock pulse. The odd comparator signal 16′ causes the odd request flip-flop 24 to change the state of the odd request signal 29 to the "low" state but immediately thereafter the odd termination signal 21 causes the odd request flip-flop 24 to change, yet again, the state of the odd request signal 29 to the "high" state. Accordingly, in FIG. 4-2, the odd request signal 29 never appears to have changed states. The odd termination signal 21 also causes the control flip-flop 28 to change the state of the control signal 31 from the "odd channel" to the "even channel". Since the even request signal 27 was left in the "high" state at the end of the first even spatial clock pulse, the exposure signal 33 will remain at the "high" state and the even request signal 27 will now control the exposure signal 33.

This completes the pixel print cycle associated with the second odd spatial clock pulse as shown in FIG. 4-2. This pixel print cycle has been labeled "Pixel #3". Pixel #3 has a "compressed" width associated therewith and has an actual print density of 1021 which corresponds with the desired print density for the second odd spatial clock pulse as closely as possible given the speed of the exposing device 35.

The rising edge of the fourth spatial clock cycle, labeled as the second even spatial clock pulse in FIG. 4-2, causes the spatial clock rising edge detector 8 to generate an even edge signal 11 to the even counter 10. This allows the even counter 10 to start counting the individual timing clock pulses and to start producing an incrementally increasing even count signal 10′. When the even count signal 10′ reaches a count of three, the even count signal 10′ equals the desired print density for the second even spatial clock pulse and so the even comparator 14 on the fifth timing clock pulse will assert the even comparator signal 14′ for one timing clock pulse. The even comparator signal 14′ causes the even request flip-flop 22 to switch the state of the even request signal 27 to the "low" state at the sixth timing clock pulse. Since the control signal 31 is set to the "even channel", the exposure signal 33 changes from the "high" state to the "low" state. The even counter 12 continues counting the timing clock pulses and continues producing an incrementally increasing even count signal 10′ until the 1024<sup>th</sup> timing clock pulse after the rising edge of the second even spatial clock pulse which corresponds to the 3<sup>rd</sup> timing clock pulse in the third odd spatial clock pulse. The counting of the 1024<sup>th</sup> timing clock pulse causes the even counter 10 to assert the even overflow signal 15. The even termination selector 18 receives the even overflow signal 15 but this has no effect on the even termination selector 18 because the most significant bit of the desired print density is "0".

The rising edge of the third odd spatial clock pulse causes the spatial clock rising edge detector 8 to generate an odd edge signal 9 to the even termination selector 18 and the odd counter 12. The combination of the most significant bit of the second even spatial clock pulse being "0" and the assertion of the odd edge signal 9 causes the termination selector 18 (FIG.1B) to assert the even termination signal 23 on the first timing clock pulse of the third odd spatial clock pulse. The assertion of the even termination signal 23 causes the even request flip-flop 22 to change the state of the even request signal 27 from the "low" state to the "high" state and also causes the control flip-flop 28 to change the exposure signal 33 from the "even channel" to the "odd channel". Since the odd request signal 29 was left in the "high" state at the end of the second odd spatial clock pulse, the exposure signal 33 will change to the "high" state and the odd request signal 29 will now control the exposure signal 33.

This completes the pixel print cycle associated with the second even spatial clock pulse as shown in FIG. 4-2. This pixel print cycle has been labeled "Pixel #4". Pixel #4 has a "compressed" width associated therewith and has an actual print density of 1. The actual print density associated with Pixel #4 differs from the desired print density associated with the second even spatial clock pulse because all of the accumulated errors produced by the data circuitry 2 are disposed into Pixel #4. The accumulated errors are all the errors associated with the data circuitry 2 sequentially exposing individual adjacent pixel locations on the image recording medium with an exposing device 35 that is traveling too slow or too fast across the image recording medium. The reason why the accumulated errors are disposed into Pixel #4 is quite simple, the human visual system has a hard time perceiving the accumulated error when it is disposed in Pixel #4. The human visual system is hard pressed to distinguish any minor grey scale errors in the color of adjacent pixels when the colors associated with the adjacent pixels are at or near the opposite ends of the grey scale. In FIG. 4-2 using the preferred carbon based thermal medium as the image recording medium, the desired pixel density associated with Pixel #3 represents a very dark grey color while the desired pixel density associated with Pixel #4 represents a very light grey color. The transition between the dark grey color of Pixel #3 to the light grey color of Pixel #4 produces a distinct visible edge. The human visual system is hard pressed to distinguish any minor grey scale errors in the colors of the adjacent pixels, namely, Pixel #3 and Pixel #4, which make up the distinct visible edge. Accordingly, the data circuitry 2 in FIG. 1A disposes all the accumulated errors due to the data circuitry operating under a high or a low spatial clock frequency into the later of the two adjacent pixels that produce the distinct visible edge, namely, into Pixel #4. It should also be obvious to one skilled in the art that the data circuitry 2 in FIG. 1A could also be modified such that the accumulated errors due to the data circuitry 2 operating under high or a low spatial clock frequency could be disposed in the former of the two adjacent pixels that produce the distinct visible edge, namely, into Pixel #3 by merely redefining the pixel boundaries.

Other embodiments of the invention including additions, subtractions, deletions, and other modifications of the preferred disclosed embodiments of the invention will be obvious to those skilled in the art and are within the scope of the following claims.

What is claimed is:

1. An improved process for modulating an exposing device in a printing apparatus so as to expose a continuous tone image onto an image recording medium wherein the printing apparatus includes a spatial clock which produces spatial clock pulses, each spatial clock pulse defining an amount of time required for the exposing device to travel across a pixel on the image recording medium, and a timing clock which produces timing clock pulses at a rate faster than a rate at which the spatial clock produces spatial clock pulses, the printing apparatus also providing a desired print density for each pixel to be printed, the improved process comprising the steps of:

A) commencing to count the timing clock pulses at a rising edge of a first spatial clock pulse, i) continuing to count the timing clock pulses of the first spatial clock pulse until a terminal value is reached;

ii) setting an even channel request signal to a first state at the commencement of the count of the timing clock pulses of the first spatial clock pulse and thereafter setting the even channel request signal to a second state when the count of the first spatial clock pulse represents a desired print density of said pixel to be printed onto the image recording medium;

iii) setting the even channel request signal to the first state and enabling an odd channel to control an intensity level of the exposing device at a rising edge of a next succeeding spatial clock pulse when the desired print density of the pixel to be printed is less than a standard print density; or iv) setting the even channel request signal to the first state and enabling the even channel to control the intensity level of the exposing device when the count of the timing clock pulses of the first spatial clock pulse reaches the terminal value when the desired print density of the pixel to be printed is more than the standard print density;

B) commencing to count timing clock pulses at the rising edge of the next succeeding spatial clock pulse independently of the count of the first spatial clock pulse, i) continuing to count the timing clock pulses of the next succeeding spatial clock pulse until the terminal value is reached;

ii) setting an odd channel request signal to the second state when the count of the next succeeding spatial clock pulse represents a desired print density for a next succeeding pixel to be printed onto the image recording medium;

iii) setting the odd channel request signal to the first state and enabling the even channel to control the intensity level of the exposing device at the rising edge of the next succeeding spatial clock pulse when the desired print density of the pixel to be printed is less than the standard print density; or iv) setting the odd channel request signal to the first state and enabling the even channel to control the intensity of the exposing device when the count of the timing clock pulses of the next succeeding spatial clock pulse reaches the terminal value if the desired print density of the pixel to be printed is greater than the standard print density; and C) repeating steps A and B until a scan line of the image is completely exposed.

2. The process of claim 1 wherein a ratio of a frequency of the timing clock to a nominal frequency of the spatial clock defines the terminal value.

3. The process of claim 1 wherein the standard print density is a minimum of a derivative of a perceived lightness with respect to an exposure of the image recording medium.

4. The process of claim 1 wherein the standard print density is in a range between 0.4 to 0.6 of a maximum value for the desired print density.

5. The process of claim 1 wherein the even state of the even channel request signal and the odd state of the odd channel request signal are related to two different intensity levels on the exposing device.

6. The process of claim 1 wherein the exposing device is selected from the group comprising a light emitting diode, a shuttered arc lamp, a shuttered Xenon lamp, a shuttered gas laser, a solid state laser, and a semiconductor laser.

7. An improved process for modulating an exposing device in a printing apparatus so as to expose a continuous tone image onto an image recording medium wherein the printing apparatus includes a spatial clock which produces spatial clock pulses, each spatial clock pulse defining an amount of time required for the exposing device to travel across a pixel on the image recording medium, and a timing clock which produces timing clock pulses at a rate faster than a rate at which the spatial clock produces spatial clock pulses, a plurality of sequential said timing clock pulses defining a pixel print cycle, the printing apparatus also providing a desired print density for each pixel to be printed, the improved process comprising the steps of:
   A) commencing to count the timing clock pulses at a rising edge of a first spatial clock pulse,
      i) continuing to count the timing clock pulses of the first spatial clock pulse until a terminal value is reached;
      ii) setting an even channel request signal to a first state at a commencement of the count of the timing clock pulses of the first spatial clock pulse and thereafter setting the even channel request signal to a second state when the count of the first spatial clock pulse represents a desired print density of a pixel to be printed onto the image recording medium;
      iii) adding or subtracting said timing clock pulses of the first spatial clock pulse to or from a present said pixel print cycle so that the present pixel print cycle will terminate at a rising edge of a next succeeding spatial clock pulse and, at the rising edge of the next succeeding spatial clock pulse, setting the even channel request signal to the first state and enabling an odd channel to control an intensity level of the exposing device when the desired print density of the pixel to be printed is less than a standard print density; or
      iv) adding or subtracting said timing clock pulses of the first spatial clock pulse to or from the next pixel print cycle so that the next pixel print cycle will start when the count of the timing clock pulses of the first spatial clock pulse reaches the terminal value and, when the count of the timing clock pulses of the first spatial clock pulse reaches the terminal value, setting the even channel request signal to the first state and enabling the odd channel to control the intensity level of the exposing device when the desired print density of the pixel to be printed is more than the standard print density;
   B) commencing to count timing clock pulses at the rising edge of the next succeeding spatial clock pulse independently of the count of the first spatial clock pulse,
      i) continuing to count the timing clock pulses of the next succeeding spatial clock pulse until the terminal value is reached;
      ii) setting the odd channel request signal to the second state when the count of the next succeeding spatial clock pulse represents a desired print density for a next succeeding pixel to be printed onto the image recording medium;
      iii) adding or subtracting timing clock pulses of the next succeeding spatial clock pulse to or from the present pixel print cycle so that the present pixel print cycle will terminate at the rising edge of the next succeeding spatial clock pulse and, at the rising edge of the next succeeding spatial clock pulse, setting the odd channel request signal to the first state and enabling an even channel to control the intensity level of the exposing device when the desired print density of the pixel to be printed is less than the standard print density; or
      iv) adding or subtracting said timing clock pulses of said first spatial clock pulse to or from the next pixel print cycle so that the next pixel print cycle will start when the count of the timing clock pulses of said first spatial clock pulse reaches the terminal value and, when the count of the timing clock pulses of said first spatial clock pulse reaches the terminal value, setting the odd channel request signal to the first state and enabling the even channel to control the intensity level of the exposing device when the desired print density of the pixel to be printed is more than the standard print density; and
   C) repeating steps A and B until a scan line of the image is completely exposed.

8. The process of claim 7 wherein a ratio of a frequency of the timing clock to a nominal frequency of the spatial clock defines the terminal value.

9. The process of claim 7 wherein the standard print density is a minimum of a derivative of a perceived lightness with respect to an exposure of the image recording medium.

10. The process of claim 7 wherein the standard print density value is in a range between 0.4 to 0.6 of a maximum value for the desired print density.

11. The process of claim 7 wherein the even state of the even channel request signal and the odd state of the odd channel request signal are related to two different intensity levels on the exposing device.

12. The process of claim 7 wherein the exposing device is selected from the group comprising a light emitting diode, a shuttered arc lamp, a shuttered Xenon lamp, a shuttered gas laser, a solid state laser, and semiconductor laser.

13. An apparatus for modulating an intensity of an exposing device in a printing apparatus so as to expose a continuous tone image onto an image recording medium, the printing apparatus including a spatial clock which produces spatial clock pulses, each spatial clock pulse defining an amount of time required for the exposing device to travel across a pixel on the image recording medium, and a timing clock which produces timing clock pulses at a rate faster than a rate at which the spatial clock produces spatial clock pulses, the printing apparatus also providing a desired print density for each pixel to be printed, the apparatus comprising:

A) odd channel circuitry means for counting the timing clock pulses commencing at a rising edge of each odd numbered spatial clock pulse and continuing until a terminal value is reached; and B) even channel circuitry means for counting the timing clock pulses commencing at a rising edge of each even numbered spatial clock pulse and continuing until the terminal value is reached, wherein, when a count by the odd channel circuitry means reaches a value associated with the desired print density of a present odd numbered pixel to be printed, the odd channel circuitry means requests that an intensity level of the exposing device be changed from a first state to a second state and, thereafter, if the desired print density of the present odd numbered pixel to be printed is less than a standard print density, the odd channel circuitry means passes control over the intensity level of the exposing device to the even channel circuitry means at a rising edge of a next even numbered spatial clock pulse or, if the desired print density of the present odd numbered pixel to be printed is greater than the standard print density, the odd channel circuitry means passes control over the intensity level of the exposing device to the even channel circuitry means when the count by the odd channel circuitry means reaches the terminal value and, thereafter, regardless of the standard print density of the present pixel to be printed, the odd channel circuitry means requests that the exposing device be set to the first state in anticipation of the odd channel circuitry means regaining control over the intensity level of the exposing device during subsequent odd numbered spatial clock pulses, and, when a count by the even channel circuitry means reaches a value associated with the desired print density of a present even numbered pixel to be printed, the even channel circuitry means requests that the intensity level of the exposing device be changed from the first state to a second state and, thereafter, if the desired print density of the present even numbered pixel to be printed is less than the standard print density, the even channel circuitry means passes control over the intensity level of the exposing device to the odd channel circuitry means at a rising edge of a next odd numbered spatial clock pulse or, if the desired print density of the present even numbered pixel to be printed is greater than the standard print density, the even channel circuitry means passes control over the exposing device to the odd channel circuitry means when the count by the odd channel circuitry means reaches the terminal value, and, thereafter, regardless of the standard print density of the present even numbered pixel to be printed, the even channel circuitry means requests that the exposing device be set to the first state in anticipation of the even channel circuitry regaining control over the intensity level of the exposing device during subsequent even numbered spatial clock pulses.

14. The apparatus of claim 13 further comprising a spatial clock rising edge detector circuitry which receives the spatial clock pulses and the timing clock pulses from the printing apparatus and provides an odd rising edge signal at the rising edge of each odd numbered spatial clock pulse and an even rising edge signal at the rising edge of each even numbered spatial clock pulse.

15. The apparatus of claim 14 wherein the even channel circuitry means comprises:

a) even counter circuitry for counting the timing clock pulses, upon receipt of the even rising edge signal from the spatial clock rising edge detector circuitry, to the terminal value and for generating an even count signal for each timing clock pulse that is counted and an even overflow signal when the even count signal exceeds the terminal value;

b) even comparator circuitry for receiving the even count signal from the even counter circuitry and the desired print density of a present even pixel to be printed from the printing apparatus and for generating an even comparator signal when the even count signal represents the value associated with the desired print density of the present even pixel to be printed;

c) even termination selector circuitry for receiving the odd rising edge signal from the spatial clock rising edge detector circuitry, the standard print density associated with the present even pixel to be printed from the printing apparatus, and the even overflow signal from the even counter circuitry and for either (i) generating an even termination signal upon the receipt of the even overflow signal if the desired print density associated with the present even pixel to be printed is greater than the standard print density value or (ii) generating the even termination signal upon receipt of the odd rising edge signal if the desired print density associated with the present even pixel to be printed is less than the standard print density value; and d) even request circuitry for generating an even request signal upon the receipt of the even termination signal from the even termination selector circuitry and for the disabling of the even request signal upon the receipt of the even comparator signal from the even comparator circuitry.

16. The apparatus of claim 15 wherein the odd channel circuitry means comprises:

a) odd counter circuitry for counting the timing clock pulses, upon receipt of the odd rising edge signal from the spatial clock rising edge detector circuitry, to the terminal value and for generating an odd count signal for each timing clock pulse that is counted and an odd overflow signal when the odd count signal exceeds the terminal value;

b) odd comparator circuitry for receiving the odd count signal from the odd counter circuitry and the desired print density of a present odd pixel to be printed from the printing apparatus and for generating an odd comparator signal when the odd count signal represents the value associated with the desired print density of the present odd pixel to be printed;

c) odd termination selector circuitry for receiving the even rising edge signal from the spatial clock rising edge detector circuitry, the standard print density associated with the present odd pixel to be printed from the printing apparatus, and the odd overflow signal from the odd counter circuitry and for either (i) generating an odd termination signal upon the receipt of the odd overflow signal if the desired print density associated with the present odd pixel to be printed is greater than the standard print density value or (ii) generating the odd termination signal upon receipt of the even rising edge signal if the desired print density associated with the present odd pixel to be printed is less than the standard print density value; and d) odd request circuitry for generating an odd request signal upon the receipt of the odd termination signal from the odd termination selector circuitry and for the disabling of the odd request signal upon receipt of the odd comparator signal from the odd comparator circuitry.

17. The apparatus of claim 16 wherein the odd channel circuitry means and the even channel circuitry means further comprise selection circuitry which is jointly shared by both the odd channel circuitry and the even channel circuitry, the selection circuitry receiving both termination signals and both channel request signals from, respectively, both termination selector circuitry and both request circuitry and therefrom passing control of the intensity level of the exposing device (i) to the even request signal upon receipt of the odd termination signal or (ii) to the odd request signal upon receipt of the even termination signal.

18. The apparatus of claim 13 wherein a ratio of a frequency of the timing clock to a nominal frequency of the spatial clock defines the terminal value.

19. The apparatus of claim 13 wherein the standard print density is a minimum of a derivative of a perceived lightness with respect to the exposure of the image recording medium.

20. The apparatus of claim 13 wherein the standard print density value is in a range between 0.4 to 0.6 of a maximum value for the desired print density.

21. The apparatus of claim 13 wherein the exposing device is selected from the group comprising a light emitting diode, a shuttered arc lamp, a shuttered Xenon lamp, a shuttered gas laser, a solid state laser, and a semiconductor laser.

22. The apparatus of claim 13 wherein the first state and the second state of the exposing device are two different intensity levels of the exposing device.

23. An apparatus for modulating an intensity of an exposing device in a printing apparatus so as to expose a continuous tone image onto an image recording medium, the printing apparatus including a spatial clock which produces spatial clock pulses, each spatial clock pulse defining an amount of time required for the exposing device to travel across a pixel on the image recording medium, and a timing clock which produces timing clock pulses at a rate faster than a rate at which the spatial clock produces spatial clock pulses, a plurality of sequential timing clock pulses defining a pixel print cycle, the printing apparatus also providing a desired print density for each pixel to be printed, the apparatus comprising:

A) odd channel circuitry means for counting the timing clock pulses commencing at a rising edge of each odd numbered spatial clock pulse and continuing until a terminal value is reached; and B) even channel circuitry means for counting the timing clock pulses commencing at a rising edge of each even numbered spatial clock pulse and continuing until the terminal value is reached, wherein, when a count by the odd channel circuitry means reaches a value associated with the desired print density of a present odd numbered pixel to be printed, the odd channel circuitry means requests that an intensity level of the exposing device be changed from a first state to a second state and, thereafter, if the desired print density of the present odd numbered pixel to be printed is less than a standard print density, the odd channel circuitry means adds or subtracts timing clock pulses to or from a present odd numbered pixel print cycle so that the present odd numbered pixel print cycle will terminate at a rising edge of a next even numbered spatial clock pulse and then, at the rising edge of the next even numbered spatial clock pulse, the odd channel circuitry means enables the even channel circuitry means to control the intensity level of the exposing device or, if the desired print density of the present odd numbered pixel to be printed is greater than the standard print density, the odd channel circuitry means adds or subtracts timing clock pulses to or from a next even numbered pixel print cycle so that the next even numbered pixel print cycle will start when the count by the odd channel circuitry means reaches the terminal value and, when the count by the odd channel circuitry means reaches the terminal value, the odd channel circuitry means enables the even channel circuitry means to control the intensity level of the exposing device and, thereafter, regardless of the desired print density of the present odd numbered pixel to printed, the odd channel circuitry means requests that the exposing device be set to the first state in anticipation of the odd channel circuitry means regaining control over the intensity level of the exposing device during the subsequent odd numbered spatial clock pulses, and, when the count by the even channel circuitry means reaches a value associated with a desired print density of a present even numbered pixel to be printed, the even channel circuitry means requests that the intensity level of the exposing device be changed from the first state to the second state and, thereafter, if the desired print density of the present even numbered pixel to be printed is less than the standard print density, the even channel circuitry means adds or subtracts timing clock pulses to or from a present even numbered pixel print cycle so that the present even numbered pixel print cycle will terminate at the rising edge of a next odd numbered spatial clock pulse and then, at a rising edge of the next odd numbered spatial clock pulse, the even channel circuitry means enables the odd channel circuitry means to control the intensity level of the exposing device or, if the desired print density of the present even numbered pixel to be printed is greater than the standard print density, the even channel circuitry means adds or subtracts timing clock pulses to or from a next odd numbered pixel print cycle so that the next odd numbered pixel print cycle will start when the count by the even channel circuitry means reaches the terminal value and, when the count by the even channel circuitry means reaches the terminal value, the even channel circuitry means enables the odd channel circuitry to control the intensity level of the exposing device and, thereafter, regardless of the desired print density of the present even numbered pixel to be printed, the even channel circuitry means requests that the exposing device be set to the first state in anticipation of the even channel circuitry means regaining control over the intensity level of the exposing device during subsequent even numbered spatial clock pulses.

24. The apparatus of claim 23 further comprising a spatial clock rising edge detector circuitry which receives the spatial clock pulses and the timing clock pulses from the printing apparatus and provides an odd rising edge signal at the rising edge of each odd numbered spatial clock pulse and an even rising edge signal at the rising edge of each even numbered spatial clock pulse.

25. The apparatus of claim 24 wherein the even channel circuitry means comprises:
   a) even counter circuitry for counting the timing clock pulses, upon receipt of the even rising edge signal from the spatial clock rising edge detector circuitry, to the terminal value and for generating an even count signal for each timing clock pulse that is counted and an even overflow signal when the even count signal exceeds the terminal value;
   b) even comparator circuitry for receiving the even count signal from the even counter circuitry and the desired print density of the present even numbered pixel to be printed from the printing apparatus and for generating an even comparator signal when the even count signal represents the value of the desired print density of the present even numbered pixel to be printed;
   c) even termination selector circuitry for receiving the odd rising edge signal from the spatial clock rising edge detector circuitry, the standard print density associated with the present even numbered pixel to be printed from the printing apparatus, and the even overflow signal from the even counter circuitry and for either (i) generating an even termination signal upon the receipt of the even overflow signal if the desired print density associated with the present even numbered pixel to be printed is greater than the standard print density value or (ii) generating the even termination signal upon receipt of the odd rising edge signal if the desired print density associated with the present even numbered pixel to be printed is less than the standard print density value; and
   d) even request circuitry for generating an even request signal upon the receipt of the even termination signal from the even termination selector circuitry and for the disabling of the even request signal upon the receipt of the even comparator signal from the even comparator circuitry.

26. The apparatus of claim 25 wherein the odd channel circuitry means comprises:
   a) odd counter circuitry for counting the timing clock pulses, upon receipt of the odd rising edge signal from the spatial clock rising edge detector circuitry, to the terminal value and for generating an odd count signal for each timing clock pulse that is counted and an odd overflow signal when the odd count signal exceeds the terminal value;
   b) odd comparator circuitry for receiving the odd count signal from the odd counter circuitry and the desired print density of the present odd numbered pixel to be printed from the printing apparatus and for generating an odd comparator signal when the odd count signal represents the value of the desired print density of the present odd numbered pixel to be printed;
   c) odd termination selector circuitry for receiving the even rising edge signal from the spatial clock rising edge detector circuitry, the standard print density associated with the present odd numbered pixel to be printed from the printing apparatus, and the odd overflow signal from the odd counter circuitry and for either (i) generating an odd termination signal upon the receipt of the odd overflow signal if the desired print density associated with the present odd numbered pixel to be printed is greater that the standard print density value or (ii) generating the odd termination signal upon receipt of the even rising edge signal of the desired print density associated with the present odd numbered pixel to be printed is less than the standard print density value; and
   d) odd request circuitry for generating an odd signal upon the receipt of the odd termination signal from the odd termination selector circuitry and for the disabling of the odd request signal upon receipt of the old comparator signal from the odd comparator circuitry.

27. The apparatus of claim 26 wherein the odd channel circuitry means and the even channel circuitry means further comprise selection circuitry which is jointly shared by both the odd channel circuitry and the channel circuitry, the selection circuitry receiving both termination signals and both channel request signals from, respectively, both termination selector circuitry and both request circuitry and thereform passing control of the intensity level of the exposing device (i) to the even request signal receipt of the odd termination signal or (ii) to the odd request signal upon receipt of the even termination signal.

28. The apparatus of claim 23 wherein a ratio of a frequency of the timing clock to a nominal frequency of the spatial clock defines the terminal value.

29. The apparatus of claim 23 wherein the standard print density is at a minimum of a derivative of a perceived lightness with respect to an exposure of the image recording medium.

30. The apparatus of claim 23 wherein the standard print density value is in a range between 0.4 to 0.6 of a maximum value for the desired print density.

31. The apparatus of claim 23 wherein the exposing device is selected from the group comprising a light emitting diode, a shuttered arc lamp, a shuttered Xenon lamp, a shuttered gas laser, a solid state laser, and a semiconductor laser.

32. The apparatus of claim 23 wherein the first state and the second state of the exposing device have different intensity levels of the exposing device.

* * * * *